(12) United States Patent
Burlina et al.

(10) Patent No.: US 12,525,025 B1
(45) Date of Patent: Jan. 13, 2026

(54) TRAINING OF MULTI-MODALITY OBJECT DETECTORS

(71) Applicant: Zoox, Inc., Foster City, CA (US)

(72) Inventors: Philippe Martin Burlina, Rockville, MD (US); Subhasis Das, San Mateo, CA (US); Xinyu Xu, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 364 days.

(21) Appl. No.: 18/123,146

(22) Filed: Mar. 17, 2023

(51) Int. Cl.
| | |
|---|---|
| *G06V 20/58* | (2022.01) |
| *G06V 10/764* | (2022.01) |
| *G06V 10/774* | (2022.01) |
| *G06V 20/70* | (2022.01) |

(52) U.S. Cl.
CPC ............ *G06V 20/58* (2022.01); *G06V 10/764* (2022.01); *G06V 10/774* (2022.01); *G06V 20/70* (2022.01)

(58) Field of Classification Search
None
See application file for complete search history.

(56) References Cited

U.S. PATENT DOCUMENTS

| | | | |
|---|---|---|---|
| 9,958,379 B1 | 5/2018 | Zhu et al. | |
| 11,062,454 B1 * | 7/2021 | Cohen | G01S 7/417 |
| 11,397,439 B1 | 7/2022 | Ferdowsi et al. | |
| 2019/0371056 A1 | 12/2019 | Wetzel et al. | |
| 2021/0201048 A1 | 7/2021 | Ion et al. | |
| 2021/0278538 A1 | 9/2021 | Chong et al. | |
| 2022/0120676 A1 * | 4/2022 | Strasfeld | G01N 21/251 |
| 2022/0147838 A1 * | 5/2022 | Gu | G06V 20/00 |
| 2022/0176892 A1 | 6/2022 | Sharma et al. | |
| 2022/0277193 A1 * | 9/2022 | Wekel | G06T 19/00 |
| 2022/0388535 A1 * | 12/2022 | Singh | G06V 10/82 |
| 2022/0405578 A1 * | 12/2022 | Antonides | G06F 18/214 |
| 2023/0331225 A1 | 10/2023 | Yartsev | |
| 2024/0071060 A1 * | 2/2024 | Barker | G06V 10/7788 |

* cited by examiner

*Primary Examiner* — Leon Viet Q Nguyen
(74) *Attorney, Agent, or Firm* — Lee & Hayes, P.C.

(57) ABSTRACT

Techniques for determining a presence of an object, especially an object such as animal or debris, in a path of a vehicle, are discussed herein. For example, sensors of various modalities, which may include multispectral sensors, may capture data representing an environment the vehicle is traversing. In examples, one or more trained machine learned (ML) models, operating on a vehicle computing system, may detect and/or classify objects in the environment, based on input data of one or more modalities or spectral bands. The ML models may be pre-trained using training data including real sensor data, synthetic data, and/or augmented data, along with auto-generated annotations. In some examples, hyperspectral data may be used to identify materials associated with detected objects. A confidence score associated with the detection of the object may also be computed. The vehicle may be controlled based on detection of the object and its classification.

20 Claims, 7 Drawing Sheets

TRAINING OF MULTI-MODALITY OBJECT DETECTORS

BACKGROUND

Safety of passengers, as well as other people and objects in proximity to a vehicle, is a major consideration for safe operation of the vehicle. Safe operation is often predicated on an accurate detection of a potential for collision with an object, and timely deployment of a safety measure. An autonomous vehicle may include multiple sensors and various systems for detecting and tracking objects surrounding the autonomous vehicle and may take these objects into account when controlling the vehicle. In some instances, the objects may be small animals, or debris on the road, and difficult to detect due to inaccuracies inherent in sensor systems. More accurate determinations of objects may assist an autonomous vehicle to traverse the environment without striking such objects.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
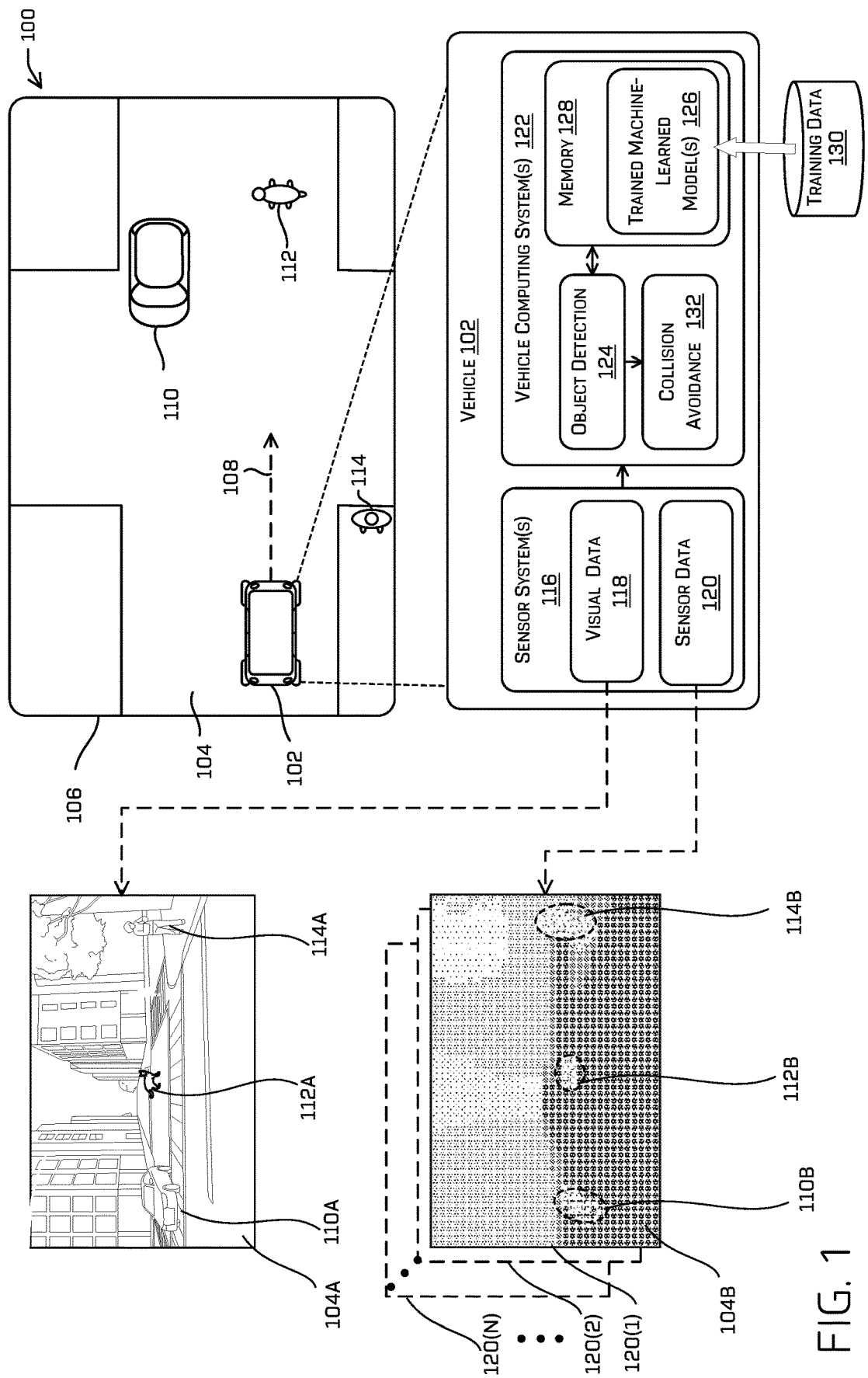
FIG. 1 illustrates an example environment that includes a vehicle implementing example systems and techniques for detecting small objects using multispectral data, as described herein.

Techniques described herein are directed to detecting objects (e.g., animals, debris, or the like) using sensor data. As discussed above, autonomous vehicles, or other vehicles with driver-assist systems, rely on multiple sensors to provide input to a perception system to detect objects in an environment surrounding the vehicle. However, small animals or debris on the roadway may be difficult to detect using sensor data from sensors of a single modality (e.g., visual image data, light detection and ranging (LiDAR) data, radio detection and ranging (RADAR) data, etc.) due to inaccuracies inherent in sensor systems. Additionally, different modalities may be more suitable for detecting different types of objects and/or objects in different environmental conditions. For example, a live animal may be easier to detect in an infrared image, whereas a fallen tree branch may be easier to detect in a visual image or in LiDAR data.

The techniques described herein may provide improved detection of such objects by using, as inputs, multi-modal or multispectral data captured by one or more sensors of the autonomous vehicle. As described herein, multi-modal data may comprise data captured by sensors of different modalities (e.g., visible light cameras, infrared cameras, LiDAR, RADAR etc.) and multispectral data may comprise data obtained in different spectral bands. In examples, the multispectral data may be captured by separate sensors operating in different spectral bands (e.g., an imaging sensor for visible light, an infrared sensor for infra-red bands, etc.), multispectral sensor(s) capturing data spanning several discrete spectral bands (e.g., ultra-violet to visible light, visible light to infra-red), and/or hyperspectral sensor(s) which may capture nearly continuous wavelengths spanning a wide range of the electromagnetic spectrum. In examples, vehicle computing system(s) of the autonomous vehicle may determine, based on sensor data from multiple spectral bands, a presence of an object in a path or trajectory of the vehicle. In techniques described herein, using data from multiple spectral bands may allow for more robust detection of objects, resulting in improved collision avoidance with animals, debris, and/or other relatively smaller objects on driving surfaces.

In examples, some of the techniques described herein may be executed by an object detection component included in a perception system of the vehicle computing system(s). In examples, the object detection component may include one or more trained machine learned (ML) models to detect and/or classify objects on the roadway, based on input data of one or more modalities or spectral bands. As an example, the ML model(s) may use, as inputs, one or more of a visible light image, an infrared image, a depth image (e.g., from LiDAR sensors), and/or the like, of a same scene. As another example, the ML model(s) may use multispectral or hyperspectral data as inputs. In some examples, the ML model(s) may be trained to output one of a set of object classes (including an output of "none" or "background"), along with a confidence score. For example, the confidence score may be a value between 0 and 1.0, indicating a probability associated with a presence of the object(s). In another example, the ML model(s) may output probability(ies) corresponding to one or more of the set of object classes (e.g., "cat": 0.7, "debris": 0.3). Additionally, in some examples, the ML model(s) may output an output image corresponding to the input image(s), the output image indicating a region or location where the object was detected. In yet another example, the ML model(s) may generate pixel-level class probabilities for the set of object classes. In some examples, separate ML model(s) may be used for detecting different classes of objects. In examples, the ML model(s) may comprise a convolutional neural network (CNN), a Recurrent Neural Network (RNN), a graph neural network (GNN), a fully convolutional network (FCN), and the like.

In other examples, sensor data from other sensor modalities (e.g., depth information from a ranging sensor) corresponding to a same region of the environment as the detected object(s) may be used to verify or confirm the presence of the objects(s).

A training data set (e.g., comprising images of objects to be detected or classified, annotated with class labels) may be required for training ML models using supervised learning techniques. Since animal sightings and debris on roadways can be rare, labeled training data comprising a large number of examples of various animals and debris in different roadway settings may be difficult to acquire. The techniques described herein provide example processes for generating additional training data using a small number of labeled data (e.g., a low-shot learning method) using various data augmentation techniques. These data augmentation techniques may be implemented by a training data generation component on a remote computing system (e.g., a computing system(s) separate from the vehicle computing system(s)), prior to training the ML model(s) to be deployed on the vehicle computing system(s) for detecting objects in the environment. The additional training data may include synthetic data (e.g., machine generated data), real sensor data with cross-modality transfer of annotations, hybrid data containing both synthetic data and real sensor data, and the like.

As discussed above, in some examples, the ML model(s) may use two or more modalities of data as inputs. To train such ML model(s), the training data would require annotated data in each of the modalities. In some examples, annotations may only be available for a single modality (e.g., a visible light image), and not for data in other modalities or spectral bands. For example, large publicly available annotated datasets are available for training object detectors in the visible light band. Therefore, visible light images may be annotated with automatically generated labels obtained as outputs from such object detectors. However, object detectors may not be available for data outside the visible light band or data of different modalities. The techniques described herein further provide example processes for transferring annotations or labels from data of one modality to unlabeled data in another modality.

As an example, visible light image(s) may be available with annotations indicating objects in the images, along with corresponding infrared image(s) of the same scene illustrating the same object(s), but without annotations. In this example, the infrared image may be aligned with the visible light image using known intrinsic and extrinsic parameters of corresponding sensors, such as geometric relationships between the visible light and infrared sensors, and relationships between elements of the scene. Image alignment, or registration, may also be based on matching detected keypoints between the image(s) of the two modalities and/or by determining a transformation (e.g., homography) between the corresponding images. After alignment, the annotations (e.g., bounding boxes, segmentation masks, outlines, and the like) indicating the objects of interest in the scene may be transferred from the visible light image to corresponding location(s) in the infrared image.

In real world scenarios, two or more modalities of data corresponding to a same scene and captured at a same time or a time close to each other, also referred to as "paired" or "companion" data, may not be available. In some examples, only a single modality of data may be available. For example, only one modality of data may be available for a given scene, and/or of a given object. The techniques described herein include generating data of a second modality from data of a first modality using image translation or style transfer networks trained on paired or unpaired (e.g., different scenes or captured at different times) sets of data of the first modality and the second modality.

In another real-world scenario, adequate number of training data may not be available corresponding to rare occurrences (e.g., data depicting a specific type of animal crossing a street, a specific type of debris in a specific area of a scene, etc.). To address inadequacies in availability of training data, the training data generation component may include generating synthetic data utilizing generative machine learned models that are configured to generate images in response to text prompts (e.g., Stable Diffusion, DALL-E, Fotor, etc.). For example, the training data generation component may provide text prompts to the generative machine learned models to obtain, as output, an image of the first modality in accordance with the text prompts. A corresponding image of a second modality may be generated using the image translation or style transfer networks as described above.

As another example, road scenes typical of the environment traversed by the autonomous vehicle may be generated by generative neural networks such as generative adversarial networks (GANs), variational autoencoders (VAEs), visual transformer(s) such as Image GPT, and/or recursive neural network (RNN) trained on large datasets of typical road scenes (e.g., which may be captured by vehicles during driving operations). The training data generation component may augment such synthetic road scenes by adding specific types of objects at specified locations, to generate instances of training data corresponding to rare situations (e.g., a toddler on the roadway, a cat crossing the road in a particular location, a turtle or a raccoon on the roadway, etc.) for which no (or few) real sensor data are available.

In examples, the remote computing system(s) may implement a training component for training machine learned (ML) model(s) (e.g., a CNN, RNN, GNN, FCN, etc.) using training data, which may be any combination of real sensor data, synthetic data, or augmented data of one or more modalities. In some examples, the ML model(s) may comprise a bank of ML models (e.g., individual models, each trained to detect specific objects. In some examples, the training component may implement self-supervised learning techniques to obtain a trained ML model, starting with a pre-trained model.

In some examples, the first modality or the second modality of data may include multispectral data or hyperspectral data. Multispectral data may comprise data captured in multiple spectral bands of the electromagnetic spectrum by one or more sensor(s) disposed on the autonomous vehicle. In examples, separate sensor(s) may be used to capture the multispectral data, each sensor capturing data in one or more spectral bands, or a single sensor system (e.g., a sensor array) configured to capture multispectral data may be used. In some examples, the autonomous vehicle may be equipped with hyperspectral sensor(s) which may capture data representing the environment in nearly continuous wavelength bands, including wavelength bands outside the visible light bands (e.g., low-wavelength infrared (LWIR), short-wave infrared (SWIR) ultraviolet (UV), radio spectrum, x-ray etc.). The hyperspectral sensor(s) may capture a large number of images of the scene covering wavelengths in one or more bands (e.g., of the order of thousands of images). Materials (both man-made and natural), which may be associated with objects such as animals and debris, exhibit unique spectral signatures (e.g., intensity of response in specific spectral bands). For example, debris may exhibit different spectral signatures based on composition (e.g., metallic objects, such as parts from vehicles, may exhibit a different spectral signature than debris consisting of tree branches and leaves). As another example, a furry animal may exhibit a spectral signature corresponding to fur. In examples, response in different spectral bands may be used to detect different materials, object classes and/or attributes of objects. For example, visual light bands may be used for determining an object class and infrared band may be used for detecting attributes such as indication of a living object.

In examples, the object detection component may determine a presence of object(s) in a scene based on detecting spectral signatures characteristic of the object(s). In some examples, an object may be represented as a graph, where nodes of the graph indicate a spectral signature of material(s) associated with the object, and edges indicate a proximity or adjacency between the spectral signatures of the nodes. In some examples, the edges may include additional information such as a three-dimensional angle between the nodes, and/or a viewing angle corresponding to the edge configuration (e.g., an azimuth or elevation relative to the vehicle). In examples, the object detection component may use graph neural networks (GNNs) for identifying a match between a graph representation of the scene and a library of graph representations corresponding to objects or object classes commonly encountered in the environment of the autonomous vehicle.

In examples, the techniques for generating spectral signatures corresponding to the scene, or a portion thereof, may include a dimensionality reduction step, wherein a number of spectral bands in a high-dimensional multispectral data is reduced to low-dimensional data in a small number (e.g., 2 to 10) of spectral bands. In some examples, the reduced (or low-dimensional) data may be obtained from the high-dimensional data using dimensionality reduction techniques such as Principal Component Analysis (PCA), Uniform Manifold Approximation and Projection (UMAP), Linear Discriminant Analysis (LDA), and the like. In such examples, the spectral signature may comprise a projection of the high-dimensional multispectral data on a low-dimensional subspace determined by the dimensionality reduction techniques (e.g., a set of basis vectors). In other examples, spectral bands in the reduced data may be determined based on spectral responses of commonly-encountered materials in road scenes. As an example, hemoglobin (which indicates a live animal), may be detected from response in specific spectral bands, and these bands may be reweighted to increase their relative importance. Similarly, other materials associated with objects of interest may exhibit characteristic response intensities in a few specific bands, and these specific bands may be retained in the reduced data, while data in other bands may be ignored.

In examples, the object detection component may determine the presence of the object(s) by determining a match between a spectral signature in the reduced data, and a library of known spectral signatures. In examples, the library may include spectral signatures from materials and/or classes of objects of interest typically encountered in a road scene (e.g., various animals, debris of various kinds, humans as pedestrians, cyclists, skateboarders, etc.). The library of known signatures may be previously generated and stored in a memory accessible to the vehicle computing system(s). In some examples, the spectral signatures of the library may comprise histogram representations of intensity response of various materials in specific spectral bands, and matches may be determined based on a histogram intersection score between the spectral signatures of the library and the spectral signature corresponding to the scene or the portion of the scene. In other examples, the spectral signatures may be represented as points in the low-dimensional space of the reduced data, and a distance metric (e.g., Euclidean, cosine similarity, etc.) may be used to determine a distance between the signatures, where a match corresponds to a distance lower than a threshold distance. In yet other examples, the library may include graph representations of the objects of interest indicating spatial relationships between different spectral responses, as discussed above. In any of these examples, a machine learned model may be trained to output one or more materials and/or object classes matching an input spectral response captured from the scene.

Additionally, in some examples, the object detection component may determine if a living object is present in the scene. Oxy- and deoxy-hemoglobin (which are active constituents of blood in living animals) have characteristic spectral signatures in low-wavelength infrared (LWIR) and visible bands of the spectrum. The spectral signature of the scene or a portion of the scene may be reweighted to emphasize the bands corresponding to the oxy- and deoxy-hemoglobin absorbance/reflectance signatures, and may be compared with a characteristic spectral signature of hemoglobin, to determine if a match is present. In some examples, a neural network, trained to output a determination of whether an input spectral signature indicates a presence of hemoglobin, may be used to determine if a match is present.

In examples, the object detection component may determine presence of an object and/or its classification, based on the determined match(es), since each spectral signature is associated with an object class or a feature of the object class (e.g., a material associated with the class). The techniques described may provide a classification of the detected object (e.g., type of animal, type of debris, whether dead or alive) which may be important for decisions made by the autonomous vehicle for safely traversing the environment in the presence of such objects. As an example, the object detection component may determine the presence of debris on roadway, along with whether the debris corresponds to metal, plastic, cardboard, vegetation, etc. In such an example, a cardboard debris may be ignored, whereas a metallic debris may be dangerous if impacted, and therefore, may require evasive maneuvers for safe operation.

In some examples, the vehicle can be controlled based on the classification of the object (e.g., object class, type of material, dead or alive, etc.). Example operations to control the vehicle may include, but are not limited to, a safe stop, an emergency stop, determining a trajectory to avoid the object, determining a trajectory to avoid a predicted location of the object, and the like. Additional operations based on the presence of the object may include prediction operations e.g., the object may be tracked to determine its trajectory over time, and the confidence score may be at least in part determined based on the tracking information of previously detected object(s).

The object detection techniques described herein can improve a functioning of a computing device by providing a robust method of estimating or otherwise determining presence of an object impacting a planned trajectory of an autonomous vehicle. For example, these techniques may detect objects that may be undetected or misclassified based on sensor data of a single modality (e.g., visual data, depth data etc.). In addition, the techniques described require a limited number of labeled training data, which is advantageous because training data are often not readily available for rare situations such as the presence of specific types of animals or debris on different types of driving environments. The techniques may also utilize multispectral data that indicate a type of the object (e.g., composition material(s), dead or alive, etc.), allowing the vehicle computing system(s) to make better decisions for controlling the vehicle. In some examples, the techniques can be used in a primary/secondary computing system architecture, which allows for redundant systems to improve overall reliability and safety outcomes. These and other improvements to the functioning of the computer are discussed herein.

The techniques described herein can be implemented in a number of ways. Example implementations are provided below with reference to the following figures, FIGS. 1-7. Although discussed in the context of an autonomous vehicle, the methods, apparatuses, and systems described herein can be applied to a variety of systems (e.g., a remote sensing system or a robotic platform), and are not limited to autonomous vehicles. In one example, similar techniques may be utilized in driver-controlled vehicles in which such a system may provide a warning or an indication of potential collision with a detected object in a path of the vehicle. In another example, the techniques can be utilized in a manufacturing assembly line context, in an aerial surveying context, or in a nautical context. Additionally, the techniques described herein can be used with real data (e.g., captured using sensor(s)), simulated data (e.g., generated by a simulator), or any combination of the two.

FIG. 1 is a schematic illustration showing an example environment 100 in which the techniques discussed herein may be implemented. The example environment 100 shows a vehicle 102, which may be an autonomous vehicle, driving along a roadway 104 or other drivable surface through a portion of the environment (e.g., a scene 106), along a trajectory 108. The scene 106 also illustrates another vehicle 110 driving along the roadway 104, an object 112 (e.g., a small animal) along the trajectory 108 of the vehicle 102, and a pedestrian 114 on a sidewalk adjacent to the roadway 104 and outside the trajectory 108 of the vehicle 102.

As illustrated, the vehicle 102 may include a plurality of sensor system(s) 116, with any number of different modalities, for sensing the environment of the vehicle 102. Without limitation, the sensor system(s) 116 may generate, as a first modality, visual data 118 using camera(s) capturing visible light reflected from elements in the scene 106. The sensor system(s) 116 may also generate a second modality of sensor data 120 from a second modality of sensors which may include one or more sensors in a spectral band outside the visible light band. As an example, the sensor data 120 may comprise infra-red data which may further include near-infrared (NIR), short-wavelength infrared (SWIR) and long-wavelength infra-red (LWIR) data. As another example, the sensor data 120 may comprise multispectral data spanning several discrete spectral bands (e.g., ultra-violet to visible light, visible light to infra-red), and/or hyperspectral sensor(s) which may capture nearly continuous wavelengths spanning a wide range of the electromagnetic spectrum. Additionally, the sensor system(s) may include one or more LiDAR sensors, inertial sensors (e.g., inertial measurement units, accelerometers, magnetometers, gyroscopes, etc.), location sensors (e.g., a global positioning system (GPS)), depth sensors (e.g., stereo cameras and range cameras), radar sensors, time-of-flight sensors, sonar sensors, thermal imaging sensors, or any other sensor modalities, and the sensor data 120 may comprise data captured by any of these modalities. Sensor data of any modality may be referred to herein as an "image," where the image comprises a value of the sensor data (e.g., pixel value) at an associated location in the image (e.g., pixel location). In examples, the image(s) may be two-dimensional (2D) or three-dimensional (3D) (e.g., comprising values along an x-, y-, and z-directions in a 3D grid).

In examples, the sensor system(s) 116 may include sensors mounted on the vehicle 102, and configured such that the visual data 118 and the sensor data 120 may capture a substantially overlapping portion of the scene 106 resulting in at least a subset of elements of the scene 106 being co-visible in the visual data 118 and the sensor data 120. For example, as illustrated in FIG. 1, the visual data 118 includes representations (e.g., image pixels) corresponding to the elements of the scene 106 (e.g., pixels 104A representing the roadway 104, pixels 110A representing the other vehicle 110, pixels 112A representing the object 112, pixels 114A representing the pedestrian 114, etc.). The sensor data 120 may also include corresponding representations of the same elements of the scene 106 (e.g., blob 104B representing the roadway 104, blob 110B representing the other vehicle 110, blob 112B representing the object 112, blob 114B representing the pedestrian 114, etc.). It should be noted that appearances of the blobs 104B, 110B, 112B, 114B may be based on the modality of the sensor data 120. For example, if the sensor data 120 is an infra-red image, the blobs 110B, 112B, and 114B corresponding to warm objects may appear brighter in comparison to the blob 104B corresponding to the roadway 104.

In some examples, the sensor data 120 may correspond to multispectral data, and may include a set of data 120(1), 120(2), . . . , 120(N) associated with spectral bands 1, 2, . . . , N respectively, as shown. In general, different materials exhibit different reflectivity in different spectral bands of the electromagnetic spectrum. For example, the appearance of the blob 110B corresponding to the vehicle 110 (which has a metallic surface), the blob 112B corresponding to the object 112 (an animal which may have a furry outer surface), and the blob 114B corresponding to the pedestrian 114 may be different, both within data in a single spectral band (e.g., data 120(1)) and across data 120(1), 120(2), . . . , 120(N) in different spectral bands. As a result, a particular object associated with a particular material may be more robustly detected in data from one or more specific spectral bands. In some examples, the sensor data 120 may be of a different resolution (e.g., a lower resolution in the visual bands) than the visual data 118, and data fusion between the sensor data 120 and the visual data 118 may enable more robust and accurate object detection.

As illustrated in the block diagram accompanying FIG. 1, the sensor system(s) 116 of the vehicle 102 may capture sensor data representing the scene 106, and provide the sensor data, such as the visual data 118 and/or the sensor data 120, to vehicle computing system(s) 122. In examples, the visual data 118 and the sensor data 120 may be captured substantially simultaneously, or within a threshold duration of each other, referred to herein as "paired" or "companion" data, so that same elements of the scene appear in both data (e.g., a data point in the visual data 118 has a corresponding data point in the sensor data 120). In examples, the visual data 118 and the sensor data 120 may include metadata indicating capture time, and paired data may be identified based on the capture times indicated in the metadata. In some examples, the visual data 118 and the sensor data 120 may be captured at discrete time intervals, which may be based on a speed of the vehicle 102 (e.g., the time interval may be smaller when the speed of the vehicle 102 is higher), a complexity of the trajectory 108 of the vehicle 102, and/or a complexity of the scene 106. In other examples, the visual data 118 and the sensor data 120 may be captured at different frequencies (e.g., number of data captures per time unit may differ). In some examples, the visual data 118 and/or the sensor data 120 may be captured continuously while the vehicle 102 is traversing the environment 100.

As shown in FIG. 1, the vehicle computing system(s) 122 may comprise an object detection component 124 configured to detect one or more objects (e.g., the objects 110, 112, and 114) in the environment 100 based on data from the sensor system(s) 116. In examples, the object detection component 124, which may be included in a perception system of the vehicle 102, and may detect the objects based on the visual data 118, the sensor data 120, and/or additional sensor data received from sensors of the sensor system(s) 116. The object detection component 124 may include one or more trained machine-learned (ML) model(s) 126 stored in a memory 128 associated with the vehicle computing system(s) 122. The trained ML model(s) 126 may be configured to receive as input(s) the visual data 118 and/or the sensor data 120, and generate output data indicative of detected object(s) in the scene 106. For example, the detected object(s) may be indicated by bounding boxes, or other polygonal segments. As another example, the ML model(s) 126 may output a heatmap showing a likelihood of occupancy by detected object(s) at each location of the input.

In various examples, the ML model(s) 126 may further semantically classify the detected objects (e.g., determine an object type), for example, determine whether the object is an animal (which may further include a species of the animal) such as the object 112, a vehicle (which may further include a type of vehicle e.g., a car, a pick-up truck, a semi-trailer truck, a tractor, a bus, a train, etc.) such as the object 110, a pedestrian, such as the object 114, a building, a tree, a road sign or the like. The objects may include static objects (e.g., buildings, bridges, signs, etc.) and dynamic objects such as other vehicles, pedestrians, animals, bicyclists, or the like. In some examples, separate ML model(s) may be trained to identify each object class of a set of object classes, with each ML model generating an output indicative of presence of an object of the respective object class and/or its location in the input(s), along with a confidence score. In other examples, the ML model(s) 126 may output a probability score at each pixel location of the input(s) representing a probability of the pixel location corresponding to each object class of the set of object classes (which may include a catch-all "background" class).

In examples, the ML model(s) 126 may comprise a convolutional neural network (CNN), a Recurrent Neural Network (RNN), a graph neural network (GNN), a fully convolutional network (FCN) and the like. However, the ML model(s) 126 described herein may also refer to statistical models, heuristic models, rule-based models, or a combination thereof. For example, the ML model(s) 126 may include a statistical model that generates approximations and/or mathematical functions are usable to determine probabilities of presence and/or classification of object(s). In other words, the ML model(s) 126 may refer to any computational model that learns from training data 130 to improve accuracy of an output (e.g., object detection and/or classification).

The training data 130 may include a wide variety of input data, such as image data, video data, sensor data such as multispectral data, LiDAR data, radar data, audio data, etc., that is associated with a desired output value (e.g., a desired classification, inference of presence, prediction, etc.). In some examples the training data 130 can comprise annotations indicating presence of object(s) of interest and associated location(s) in the input data, such as a bounding boxes (e.g., two-dimensional and/or three-dimensional bounding boxes associated with an object), segments associated with the object(s), classification information (e.g., class label of the object(s)), and the like. As an example, the training data 130 used for object detection and classification may include images, both visible light as well as from other sensors, of typical environments encountered by an autonomous vehicle, with one or more objects indicated in the images along with labels indicating the type (or class) of the object. In some examples, the images may be captured by an autonomous vehicle or other vehicle during regular operations or data collection operations.

In some examples, the objects indicated in the images may be based on user input (e.g., user input indicating that the image depicts a specific class of object, which may include a location of the object in the image). In other examples, the labels may be based on output of another machine learned model or application of computer vision techniques for auto-labeling. In some examples, such labeled classifications (or more generally, the labeled output associated with training data) may be referred to as ground truth. As can be understood, presence of animals and debris on roadways are relatively rare occurrences, and therefore, appropriate training data for detecting these classes of objects are difficult to assemble, especially where the training data requires paired data in multiple modalities (e.g., visual data, multispectral data, depth data, etc.). The techniques described herein include processes for augmenting a training data set by generating additional example data points. Generation of the training data 130 for training the ML model(s) 126 are described in detail below with reference to FIG. 2 and FIG. 3.

In some examples, the object detection component 124 may classify detected objects based on temporal information. For example, motion of a detected object may be tracked over time, and characteristics of the motion (e.g., speed, uniformity of direction and speed, and the like) may be used to determine an object class. In addition, temporal information may be used to identify whether the detected object is "alive" e.g., by determining if the object is moving.

The vehicle computing system(s) 122 may consider output of the object detection component 124 for planning purposes, or to perform other operations to control the vehicle 102 to avoid collision with detected object(s). In various examples, the vehicle computing system(s) 122 may include a collision avoidance component 132 configured to determine operations based on the output of the object detection component 124. Example operations to control the vehicle may include, but are not limited to, a safe stop, an emergency stop, determining a trajectory to avoid the detected object(s), and the like. For example, the collision avoidance component 132 may determine trajectory(ies) to use to control the vehicle 102 based on location(s) of the detected object(s) and object classification(s), as determined by the trained ML model(s) 126 of the object detection component 124. The determined trajectory may include maneuvers such as a right lane change, a left lane change, staying in a lane, going around the detected object(s), or the like. The determined trajectory may additionally include speed variations (e.g., maintain velocity, accelerate, decelerate, etc.). In some examples, the vehicle computing system(s) 122 may track the detected object (e.g., in a video feed from a visible light camera), and adjust the determined trajectory based on an object trajectory determined through tracking the object.

The techniques described herein can improve a functioning of a computing device by providing a framework for improved detection of presence of an object (e.g., an animal or debris in the roadway) impacting a planned trajectory of an autonomous vehicle. As discussed, using sensor data (e.g., multispectral data) of other modalities in addition to visual data may provide previously-unavailable characterization of object(s), such as whether an animal is alive, a vehicle has its engine on, a pedestrian is running, and the like. The vehicle computing systems may determine an action for the autonomous vehicle to take based on location, classification, and/or characteristics of the detected object.

In some examples, using the techniques described herein may improve safe operation of the vehicle by characterizing the object with greater detail and accuracy as compared to previous models.

In some examples, the techniques discussed herein may reduce time and effort needed to assemble training data needed to train machine learned models for object detection. Further, such techniques provide for training of machine learned models based on larger datasets than would otherwise be possible, due to, for example, limited availability of training data, particularly images of multiple modalities of a same scene and images depicting relatively rare events such as various animals and debris in road scenes.

Figure 2:
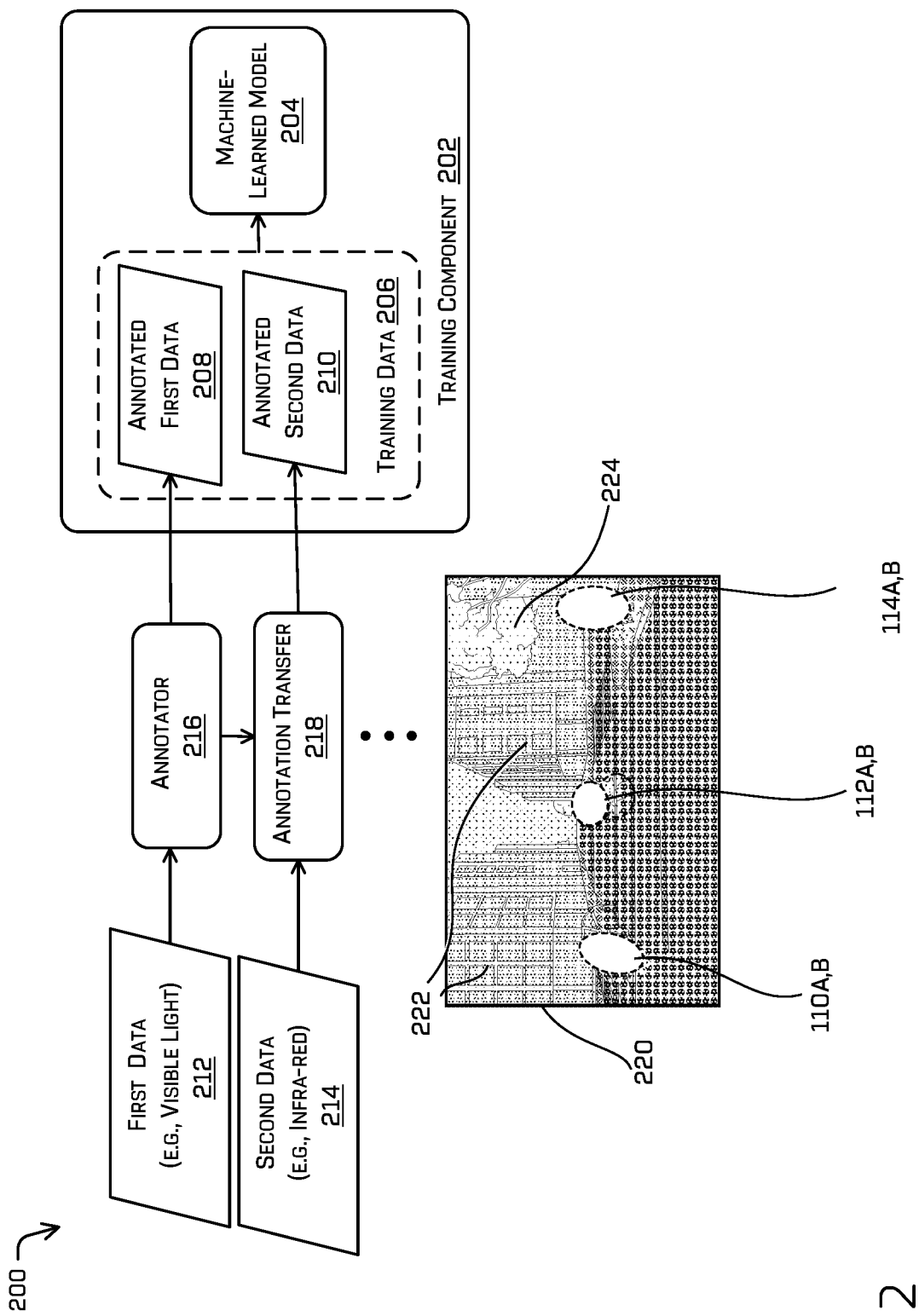
FIG. 2 illustrates a block diagram of an example process for generating training data for training a machine-learned model for detecting objects, as described herein.
Figure 3:
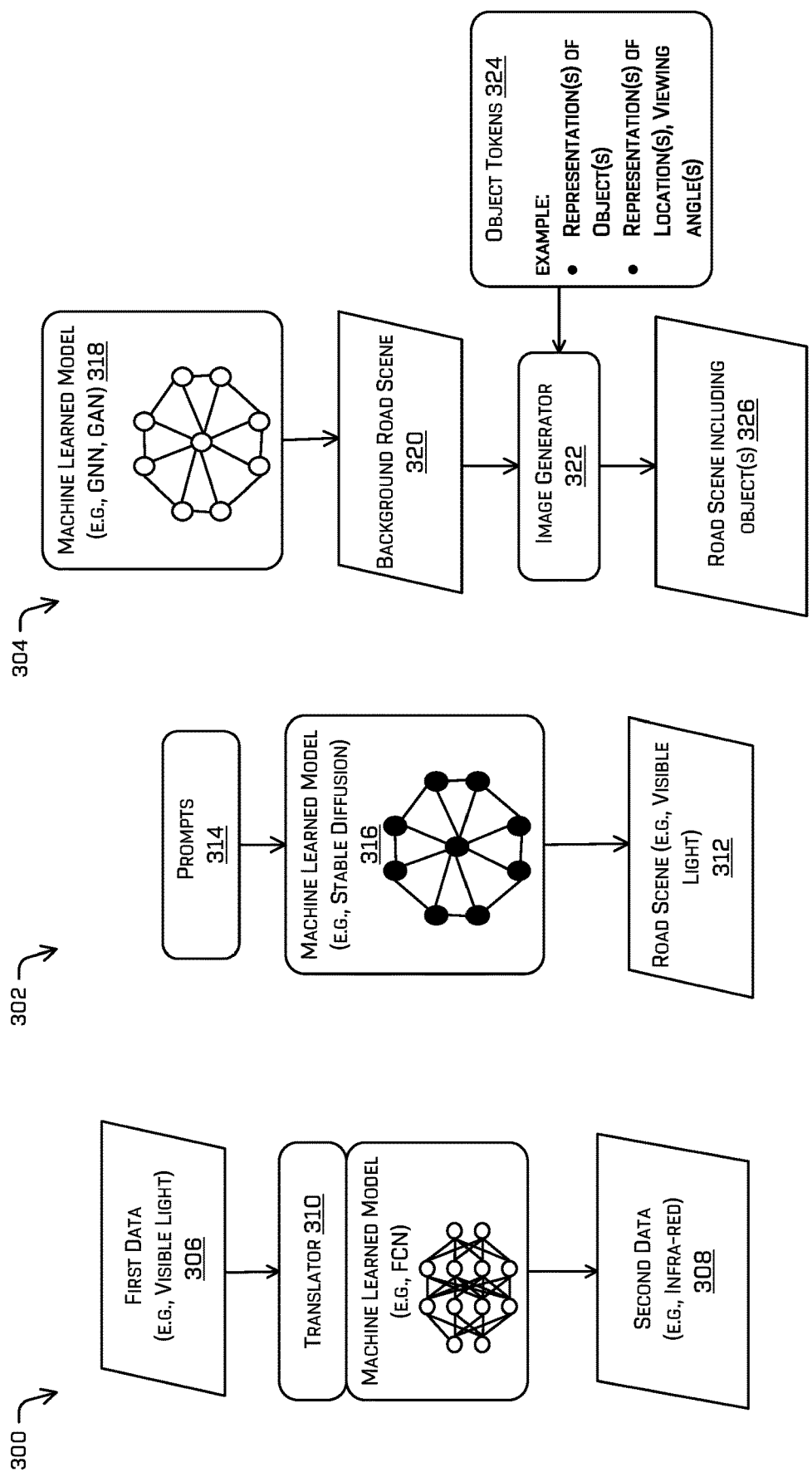
FIG. 3A-3C illustrate block diagrams for alternative example processes for generating additional training data for training a machine learned model for detecting objects, as described herein.

FIG. 2 illustrates an example block diagram of an example process 200 for generating training data for training a machine-learned model for detecting objects using at least two different modalities of data. The techniques described in the example 200 may be performed by a remote computing system(s) (e.g., a computing system(s) separate from the vehicle computing system(s) 122). For example, the remote computing system(s) may implement a training component 202, for training a machine learned (ML) model 204 (which may be similar to the ML model 126) using training data 206 (which may be similar to the training data 130). In some examples, the ML model 204 may comprise a bank of ML models (e.g., individual models, each trained to detect specific objects). In other examples, the ML model 204 may be trained to output one of a set of object class labels (including an output of "none" or "background"), along with a confidence score. In yet another example, the ML model 204 may output probability(ies) corresponding to one or more of the set of object class labels.

As discussed, the training data 206 comprises input data annotated with expected output values. These expected output values may generally be referred to as "ground truth." For example, ground truth may include an identification of specific objects in the input data, as well as a semantic classification or class label associated with the object (e.g., identifying and labeling an object as an animal or a pedestrian). The accuracy of the ML model 204 may be based on the quantity and/or accuracy of data provided in the training data 206. As a result, an appropriate dataset to train the ML model 204 may include a large quantity of input data (e.g., hundreds of thousands) with known, or previously determined, regions or segments corresponding to objects of interest depicted in a wide variety of relevant backgrounds (e.g., road scenes).

In examples, the training data 206 may comprise annotated first data 208 of a first modality, and annotated second data 210 of a second modality. For example, the annotated first data 208 may include, as input data, first data 212 (which may comprise visible light images of road scenes, for example) and corresponding annotations indicating objects of interest. Similarly, the annotated second data 210 may include second data 214 (which may comprise paired or companion images corresponding to the same road scenes captured in a spectral band different from the visible light band, or in some examples). In some examples, the first data 212 may correspond to the visual data 118 and the second data 214 may correspond to the sensor data 120 of FIG. 1. For example, the vehicle computing system(s) 122 may provide the visual data 118 and the sensor data 120 as captured by the sensor system(s) 116 of the vehicle 102, as the first data 212 and the second data 214 respectively, to the remote computing system(s) implementing the process 200. In some examples, the second data 214 may correspond to depth data (e.g., captured by LiDAR sensors or range sensors of the sensor system(s) 116), and the training data 206 may comprise RGB and depth information at each pixel of the input data (e.g., the first data 212 providing the RGB information and the paired second data 214 providing the corresponding depth information). In some examples, the data 212, 214 may be provided offline (e.g., the vehicle may not be in operation or actively collecting the data at a time the data is provided) to the remote computing system(s).

In some examples, the annotations indicating objects of interest included in the training data 206 may be generated manually (e.g., by a human operator). In manual techniques, a user interface may be provided depicting input data from a sensor associated with a vehicle, where a user is instructed to identify objects of interest (e.g., animals, pedestrians, debris, etc.) and annotate the objects by indicating region(s) or segment(s) of the data corresponding to the objects, and provide a class label. However, fully manual identification and labeling of objects can be a time-consuming, inefficient, and error-prone technique for generating training data. In addition, manually annotated training data may be limited in quantity due to the time and effort required to generate such annotations, and therefore, may be inadequate for training a ML model.

To address the technical problems and inefficiencies of manually generating training data for object detection and classification, the remote computing system(s) may implement an annotator component 216 for automatically annotating input data with indications of objects of interest via one or more algorithms configured to segment, detect, classify, and/or label objects in the first data 212. However, in examples, any combination of manual annotations and automatic annotations may be used to generate the training data 206. In some examples, the annotator component 216 may be implemented on a computing system(s) separate from the remote computing system(s) implementing the training component 202.

In some examples, the annotator component 216 may include saliency detection techniques and/or transformer neural networks that produce attention maps, to separate foreground objects from background in the scene, and the annotator component 216 may annotate the input data based on the foreground objects. Machine learned models may be trained to detect and classify common objects in visible light data (e.g., RGB images) using large, annotated public datasets (e.g., ImageNet, COCO, PASCAL VOC, KITTI, etc.) as training data. In some examples, the annotator component 216 may be trained using a public dataset to detect and classify objects in the first data 212 (which corresponds to the visual data 118). However, training data for training an annotator for the second data 214 (which is captured in a spectral band outside the visible light band) may not be readily available. Instead, the process 200 may include an annotation transfer component 218 which is configured to receive, as input, output from the annotator component 216 indicating detected and classified object(s) in the first data 212. The annotation transfer component 218 may implement algorithms for aligning the second data 214 with the first data 212, and transferring the output of the annotator component 216 (e.g., annotations indicating location(s) and class labels of detected object(s)) to corresponding locations in the second data 214.

In examples where the first data 212 and the second data 214 are captured by sensors positioned on an autonomous vehicle (e.g., a first sensor capturing the first data 212, and a second sensor capturing the second data 214), the annotation transfer component 218 may align the first data 212 and the second data 214 in a global frame of reference or a frame of reference relative to the vehicle based on a known geometric relationship between positions of the sensors on the vehicle, angle and type of the sensors, and/or extrinsic and intrinsic parameters associated with the sensors. In an example illustrated in FIG. 2, data 220 may be generated by aligning the visual data 118 (corresponding to the first data 212) and the sensor data 120 (corresponding to the second data 214), such that locations of elements in the scene 106 overlap in the data 220.

In examples where the geometric relationship between the sensors is not available, features of the first data 212 and the second data 214 may be used for alignment. In such examples, the annotation transfer component 218 may implement computer vision techniques for image registration. As a non-limiting example, the annotation transfer component 218 may use SIFT or SURF-based techniques to detect and match keypoints in the first data 212 with corresponding keypoints in the second data 214 to determine an alignment of the first data 212 with the second data 214 such that the matching keypoints overlap after alignment. In the example illustrated in FIG. 2, keypoints may be located at corners of windows 222, as an example. In another example, the annotation transfer component 218 may determine a transformation such as a homography relating planar surfaces (such as building exteriors, road surfaces, etc.) in the first data 212 with corresponding planar surfaces in the second data 214 to align the first data 212 with the second data 214. Proper alignment may be verified by verifying that other permanent structures (such as tree 224) are located in overlapping regions in the aligned data 220.

In examples, the annotation transfer component 218 may transfer annotations, such as bounding boxes, contours, segments, pixel-based labels, and the like, from the first data 212 to corresponding locations in the second data 214 after alignment, along with object classification information indicated in the annotations. In the example illustrated in FIG. 2, the pixels 112A may be annotated as "animal" (or more specifically, "cat") in the first data 212 (corresponding to the visual data 118), resulting in the corresponding pixels 112B of the second data 214 (corresponding to the sensor data 120) being annotated as "animal" (or "cat"). Similarly, the pixel blob 110B may be annotated as "car" based on an annotation of "car" associated with the pixels 110A, and the pixels 114B may be annotated as "pedestrian" based on an annotation of "pedestrian" associated with the pixels 114A.

In some examples, the training component 202 may further increase data points in the training data 206 by applying data augmentation techniques to the annotated first data 208 and/or the annotated second data 210. For example, data points in the annotated first data 208 and/or the annotated second data 210 may be modified slightly (e.g., by adding small rotations, scaling, shifts, mirroring, etc.), and added to the training data 206, along with corresponding modifications to location(s) in the annotations.

The training component 202 may train the ML model 204 based on the training data 206, which comprises the annotated first data 208 (e.g., the first data 212 and corresponding annotations) and/or the annotated second data 210 (e.g., the second data 214 and corresponding annotations), indicating an expected output for each input data point. To produce a valid output, a machine learned model (e.g., a CNN, RNN, GNN, FCN, etc.), such as the ML model 204, must first learn a set of parameters, or be "trained." Training is accomplished by iteratively adjusting the set of parameters of the ML model 204, using learning techniques such as backpropagation, to bring the output of the ML model 204 closer to the expected output. During the training, the first data 212 and/or the second data 214 are provided as inputs to the ML model 204, and the corresponding annotations, as included in the training data 206, are provided as target outputs, so that the ML model 204 learns an appearance associated with the objects in input data of the modality(ies) used in the training data 206. As understood in the art, in some ML architectures, only a global class label and a probability or confidence score is output by the ML model. In such examples, portions of the first data 212 and corresponding portions of the second data 214 (e.g., portions corresponding to segments that have been identified as objects of interest in the annotations) may be used for training instead of data depicting an entire scene. However, in other non-limiting examples, the ML model 204 may comprise a fully convolutional network (FCN), which returns an output of the same size as input data, where the output at coordinates (x, y) includes class label(s) and pixel-level confidence score(s) (or class label probabilities) associated with a pixel at coordinates (x, y) of the input data, thus localizing the detected object(s) within the input data.

In some examples, the ML model 204 may be a pre-trained model (e.g., pre-trained with a publicly available dataset such as ImageNet), and the training component 202 may implement self-supervised learning methods, where object detection in road scenes may correspond to a downstream task for the pre-trained model. Self-supervised learning methods do not require large training data-sets, and therefore, it may be possible to train the ML model 204 using training data 206 containing a few instances of the annotated data 208, 210, in accordance with a few-shot learning methodology as described herein. In some examples, when the training component 202 uses self-supervised learning to train the ML model 204, the training data 206 may not contain annotations (e.g., the training data 206 may comprise the first data 212 and the second data 214).

As discussed, using data of multiple modalities to detect and classify objects may improve robustness and accuracy of object detection/classification. In some examples, the ML model 204 may be trained with both the annotated first data 208 and the annotated second data 210 (e.g., using a composite representation, or using a multi-stage architecture with different inputs at individual stages), where the first data 212 and the second data 214 are paired or companion data. In other examples, the ML model 204 may be trained to detect/classify objects using one of the annotated first data 208 or the annotated second data 210. For example, as discussed, some objects may be more distinguishable in data of specific modality (e.g., living or warm objects may be easily detectable in infrared images, some materials may have unique signatures in certain spectral bands and therefore, be more detectable in data captured in those spectral bands, etc.). In such examples, the ML model 204 may comprise a bank of ML models each trained to detect a class of objects in input of a specific modality or specific spectral band(s).

In real world scenarios, paired data in multiple modalities may not be readily available. For example, only one modality of data may be available for a given scene, and/or of a given object. In another example, adequate number of training data may not be available corresponding to rare occurrences (e.g., data depicting a specific type of animal crossing a street, a specific type of debris in a specific area of a scene, etc.). To address inadequacies in availability of training data, training data 206 may include synthetic data (e.g., computer generated) data or augmented data (e.g., data of a real-world scene modified to add objects of interest), as described below with reference to FIGS. 3A-C.

FIG. 3A-C illustrate block diagrams for alternative example processes 300, 302, 304 for generating training data for training a machine learned (ML) model for detecting and classifying objects, such as the ML model 126 or the ML model 204. The training data generated by the example processes 300, 302, 304 may be included in the training data 206, instead of, or in addition to, the training data generated via the process 200. The example processes 300, 302, 304 may be implemented by a computing system(s), which may be separate from the remote computing system(s) implementing the training component 202.

FIG. 3A illustrates a block diagram of the process 300 for generating, from input data of a first modality, corresponding data of a second modality different from the first modality. For example, the process 300 may use first data 306 of the first modality (which may be of a same modality as the first data 212), to generate second data 308 of the second modality (which may be of a same modality as the second data 214). In examples, the process 300 may be used to generate data of the second modality from data of the first modality, when paired data is not available. In examples, the process 300 may include a translator component 310 comprising a trained machine learned model configured to generate, as output, corresponding data of the second modality (e.g., the second data 308), when provided input data of the first modality (e.g., the first data 306). In some examples, the second modality may correspond to multispectral data, and one or more translator(s) 310 may be trained to generate multispectral data as the second data 308 (e.g., a using separate translators for each spectral band). In a non-limiting example, the translator component 310 may comprise a fully convolutional network (FCN) trained using inputs of the first modality and corresponding target outputs of the second modality (e.g., paired data). For example, an FCN may be trained with the first data 212 as inputs, and corresponding paired data, the second data 214, as target outputs. Such an FCN, after training, may be used to generate the second data 308 of the second modality when provided the first data 306 of the first modality as input data.

As another example, the translator component 310 may comprise a generative ML model implementing a neural style transfer (NST) technique. The NST technique can be used to generate an output similar in appearance to a style reference image using content from an input image. For example, in an infrared image, sky and road surfaces appear dark while warmer objects such as vegetation, animals, running cars, etc., appear brighter. This appearance may be applied to an input image (which may be an RGB, visible light image) to generate a corresponding output image containing the same elements (e.g., sky, road, vegetation, objects, etc.) as the input image, but with an appearance (e.g., a look-and-feel) of an infrared image. Such a generative ML model may be trained with paired data and/or unpaired data (e.g., data that do not correspond to the same scene) of the first modality and the second modality. In some examples, the first data 306 may be captured by a sensor mounted on a vehicle. In other examples, the first data 306 may be from any source, and depict scenes that do not include road scenes (e.g., scenes from nature including vegetation and/or animals). The first data 306 and the second data 308 may be added to the training data 206, as described with reference to FIG. 2.

As discussed, some real-world scenarios are rare (e.g., a toddler on the roadway, a cat crossing the road in a particular location, a turtle or a raccoon on the roadway, etc.), and real data depicting such scenarios (of any modality) may not be available. However, it is important for an autonomous vehicle to be able to identify objects in these rare scenarios, so that appropriate actions may be taken for safe operation. FIG. 3B illustrates a block diagram of the process 302 for generating data, such as a road scene 312, corresponding to scenarios for which real data is not available in sufficient quantities for training a ML model. Machine learned models that are configured to generate images in response to text prompts are available for public use. Some examples of such machine learned models include Stable Diffusion, DALL-E, Fotor, etc. The process 302 may include providing prompts 314 to a ML model 316 (e.g., Stable Diffusion) to generate the road scene 312 which may be similar to visible light data (e.g., the first data 212). The prompts 314 may be textual prompts, numerical prompts (e.g., a random number), or tokenized representation of an object. As a non-limiting example, a road scene 312 similar to the visual data 118 may be generated by providing a text prompt similar to "A road scene with an oncoming car, a cat crossing the road, buildings on both sides of the road, and a pedestrian walking on a pavement." In some examples, a corresponding data of a different modality may be generated from the road scene 312 using the process 300 described above, and the road scene 312 and the corresponding data of different modality may be added to the training data 206 following the process 200.

While the process 302 may be used to generate road scenes, it may not be possible to control outputs of the ML model(s) 316 to generate a variety of images corresponding to each scenario (e.g., different types of roadways, different numbers and locations of objects, etc.). FIG. 3C illustrates a block diagram of the process 304 for controlling type(s) and location(s) of objects depicted in scenes generated. As shown in FIG. 3C, a generative machine learned model 318 trained on road scenes may be used to generate a background road scene 320. In examples, the generative ML model 318 may be trained on large datasets depicting typical road scenes (e.g., first data 212 or second data 214 captured by an autonomous vehicle as it traverses various environments), and may provide a different road scene as output based on an input (which may be a set of random numbers). In some examples, the ML model 318 may comprise a generative adversarial network (GAN), a variational autoencoder (VAE) or a recursive neural network (RNN) such as PixelRNN.

The background road scene 320 may be provided as input to an image generator component 322, which takes, as additional input, object token(s) 324 indicating an appearance of one or more objects (e.g., 2D or 3D appearance models), location(s) of the object(s) in the scene, and/or viewing angle relative to the vehicle. The image generator component 322 may comprise an image rendering engine configured to insert representations of the object(s) as viewed from the provided viewing angle(s) and in the corresponding location(s) of the background road scene 320, as indicated in the object tokens 324, to generate a road scene 326 including the object(s). In some examples, the location(s) may be indicated by semantic labels (e.g., roadway, pavement, crossing, etc.), and the background road scene 320 may be segmented and semantically annotated (e.g., by an annotator component similar to the annotator component 216) to determine possible placements of the object(s) in the background scene 320. As can be understood, data points for adding to the training data 206 may be generated using the process 304 by generating various background road scenes and adding various types and placements of objects to obtain synthetic images depicting various scenarios. In some examples, the image generator component 322 may be provided, as input, real images (e.g., as captured by sensors of the autonomous vehicle), and the image generator component 322 may add the objects indicated in the object tokens 324 (e.g., pedestrians, deer, ducks, etc.) to the real images to generate the road scene 326, which may be considered to be a hybrid image. Additionally, the process 304 may be used to generate road scenes 326 of any modality, since the output of the ML model 318 is based on the modality of training data used to train the ML model 318. As discussed with reference to the process 302, in some examples, a corresponding data of a different modality may be generated from the road scene 326 using the process 300 described above. The road scene 312 and the corresponding data of different modality may be added to the training data 206 discussed with reference to FIG. 2. It is to be noted that annotations indicating the object(s) in the road scene 312 and the corresponding data are known, since the object(s) are incorporated into the road scene 312 based on the object tokens 324 indicating type(s), location(s), and numbers of the object(s) in the road scene 312.

As described herein, the one or more of the processes 300, 302, 304 may be implemented on any computing system(s) to generate or augment the training data 206. In some examples, the training data 206 may be augmented with more data generated using the processes 300, 304, and/or 304 based on vehicle operations. For example, if a new scenario (e.g., a new road environment, a new type of object, etc.) is encountered or envisioned, data corresponding to the new scenario may be added to the training data 206, and the ML model 204 may be re-trained with the training data 206 after the addition. In any example, synthetic data generated by one or more of the processes 300, 302, 304 may be added to real data (e.g., the first data 212 corresponding to visual data 118, second data 214 corresponding to sensor data 120) to augment the training data 206, particularly for scenarios where real data is not readily available in sufficient quantities for training the ML model 204.

Figure 4:
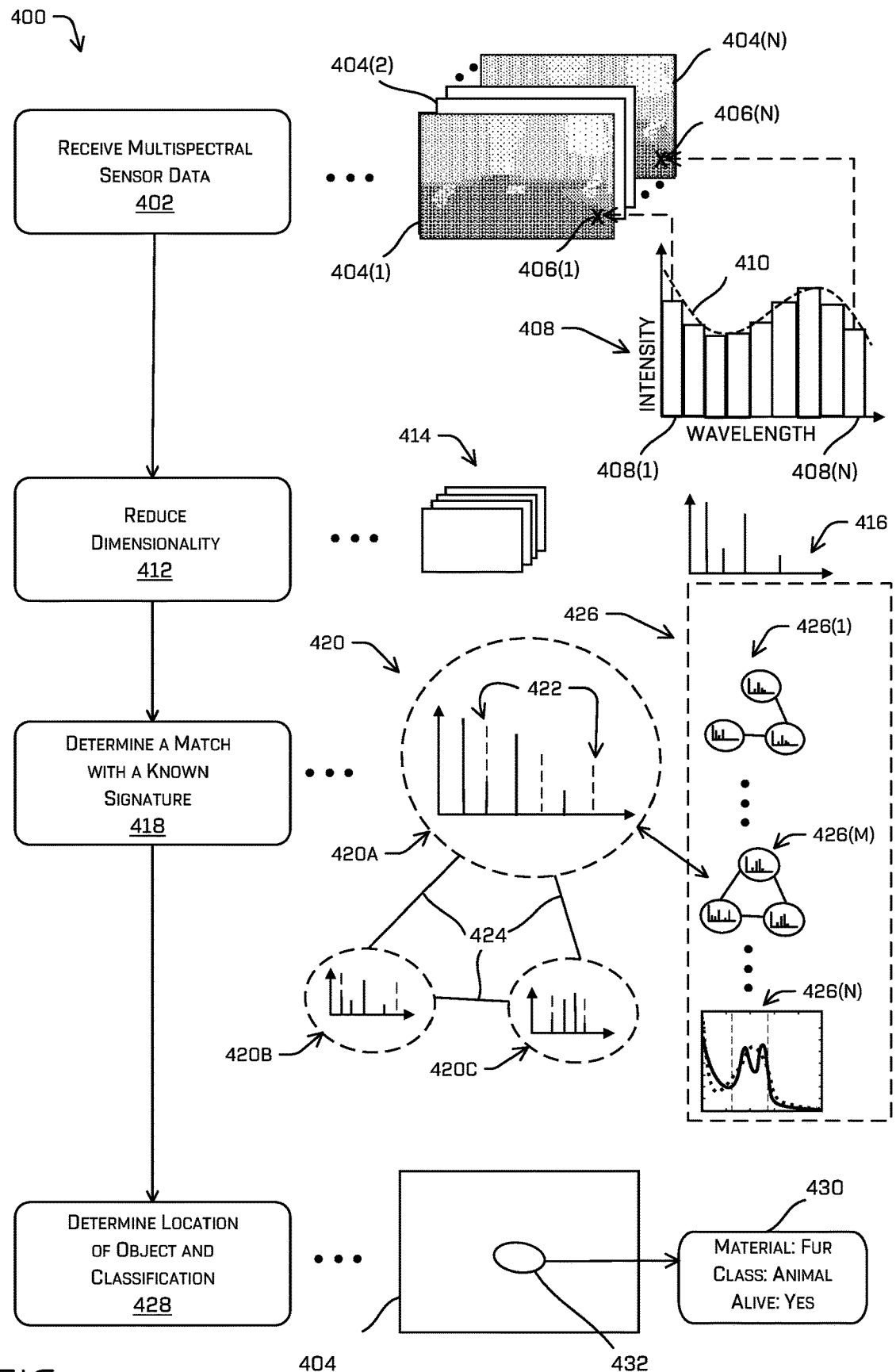
FIG. 4 includes textual and visual flowcharts to illustrate an example method for using multispectral data to determine a presence of an object in a scene, as described herein.

As discussed, in examples, a first modality may correspond to data captured in a visible light band (e.g., first data 212), whereas a second modality may correspond to data captured in a band outside the visible light band (e.g., second data 214). In some examples, the second modality may comprise data captured in multiple bands of the electromagnetic spectrum (as illustrated by sensor data 120 of FIG. 1). FIG. 4 includes textual and visual flowcharts to illustrate an example process 400 for determining a presence of an object from multispectral data. In examples described herein, the multispectral data may be obtained by one or more sensor(s) disposed on an autonomous vehicle, such as the vehicle 102. In such examples, separate sensor(s) may be used to capture data, each sensor capturing data in one or more spectral bands, or a single sensor system (e.g., a sensor array) configured to capture multispectral data may be used. As shown in FIG. 4, the process 400 determines presence of an object and/or a classification of the object, based on multispectral data representing a scene with the object. In examples, a component of vehicle computing system(s), such as the object detection component 124 of the vehicle computing system(s) 122 may implement the process 400. In some examples, the process 400 may be used to auto-label multispectral data with object class(es) to provide as training data to ML model(s) configured to detect and/or classify objects in such data.

At an operation 402, the process 400 includes receiving multispectral sensor data depicting a scene of an environment in which an autonomous vehicle is disposed. In an example illustrated in FIG. 4, spectral data 404(1), 404(2), ... ,404(N) (collectively, the data 404, which may be similar to the sensor data 120 of FIG. 1) corresponds to data in wavelength bands 1, ... ,N. As an example, data at corresponding pixel locations 406(1), ... ,406(N) of the multispectral data 404 may be represented by histogram 408, where intensity values at the pixel locations 406(1), ... ,406(N) are shown in wavelength bands 408(1), ... ,408(N) respectively. As can be understood, as number of bands, N, increases, each wavelength band may be narrower (e.g., cover a smaller range of wavelengths) and the histogram 408 would tend towards a curve 410, which represents intensity values as a continuous function of wavelength. In such examples, where N is high enough (e.g., of the order of thousand) to closely approximate the continuous curve 410, the data 404 may be referred to as "hyperspectral" data. The spectral data 404 may also include information indicating polarization of each band or relative polarization of different bands.

At an operation 412, the process 400 includes reducing dimensionality of the multispectral (or hyperspectral) data. Though the example multispectral data 404 is shown as having 9 spectral bands (N=9), in real world examples, and in particular, in examples of hyperspectral data, the value of N may be of an order of several hundreds or thousands. As a result, the corresponding data 404, which includes an image for each spectral band, may be prohibitively large in size for processing by the vehicle computing system(s) 122 in real-time or near real-time, as is required for effective collision avoidance. At the operation 412, a specialized data pre-processing component of the vehicle computing system (s) 122 or the object detection component 124 may apply a dimensionality reduction technique to the data 404 to reduce the number of bands, N, to a smaller number (e.g., 2 to 10, or a few hundreds) of selected bands. For example, the dimensionality reduction techniques may include Principal Component Analysis (PCA), Uniform Manifold Approximation and Projection (UMAP), Johnson-Lindenstrauss Transform (JLT), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA), etc. However, in alternative examples, all spectral bands may be used.

In other examples, at the operation 412, the dimensionality of the data 404 may be reduced by limiting data to selected spectral bands determined based on knowledge of response of objects of interest in specific spectral bands, and ignoring data in remaining spectral bands. As an example, hemoglobin (which indicates a live animal), may be detected from response in specific spectral bands, and these bands may be reweighted to increase their relative importance. Similarly, other materials associated with objects of interest may exhibit characteristic response intensities in a few specific bands, referred to herein as "spectral signature." In an example illustrated in FIG. 4, the dimensionality of the multispectral data 404 is shown as reduced to 4, such that the multispectral data 404 of N dimensions is converted to reduced data 414 of 4 dimensions (e.g., one image in each of the 4 selected spectral bands). In examples, a spectral response of at least a portion of the scene, as captured by multispectral or hyperspectral sensors, may be represented as a histogram of intensity values in the selected bands. In an example shown, a spectral response 416 may correspond to intensities (e.g., average intensity values) in the 4 selected spectral bands of pixels in the blob 112B associated with an area on the object 112 (an animal). In examples, the spectral response of the scene may include spatial relationships between multiple histograms, as described below.

As an example, the data 404 may be segmented, and average intensity values in the selected channels may be determined for one or more region(s) or segment(s) depicted in the multispectral data 404 to generate one or more spectral response(s) (e.g., the spectral response 416 corresponding to the blob 112B). In some examples, a paired or companion visible light image may be segmented to determine segments of interest (e.g., unclassified segments in areas classified as roadway, segments along a trajectory of the vehicle, segments within a corridor of traversal of the vehicle, etc.), and corresponding locations in the multispectral data 404 (e.g., corresponding to the segments of interest) may be determined. In such examples, spectral response(s) representing the multispectral data 404 may comprise average intensity values in the selected spectral bands from the location(s) corresponding to the segment(s) of interest. In such examples, the spectral response 416 may be based on a segment corresponding to an object of interest.

At an operation 418, the process 400 includes determining a match between a spectral response associated with the scene in the reduced data 414, and a known signature corresponding to a material and/or object class. Since materials (both man-made and natural) have unique spectral signatures, their presence may be identified based on detecting these spectral signatures. For example, a specific material may exhibit high (or low) intensity responses in specific spectral bands, referred to herein as "spectral signature," due to its characteristic spectral reflectance in those specific spectral bands. As an example application, spectral reflectance of materials such as atmospheric gases, water vapor, vegetation, and soil have been used in remote sensing. Similarly, materials associated with objects (such as animals and debris) on roadways may also exhibit unique spectral signatures. For example, debris consisting of metallic objects (e.g., parts from vehicles involved in accidents) may exhibit a first spectral signature corresponding to the metal it is composed of, debris consisting of tree branches may exhibit a second spectral signature corresponding to tree bark and vegetation, debris composed of plastic may exhibit a third spectral signature, cardboard debris may exhibit a fourth spectral signature, and so on. In some examples, a signature corresponding to an object or object class, may be represented as a graph, where nodes of the graph indicate a spectral signature of material(s) associated with the object, and edges indicate a proximity or adjacency between the spectral signatures of the nodes. As an example, an animal may exhibit a first spectral signature corresponding to fur in an area on its body, and a second spectral signature corresponding to bone in an area of its head. In this example, the first and second signatures may be associated with a first and second node of a graph signature representing the animal, with an edge between the first node and the second node indicating their expected spatial proximity or adjacency. Further, spectral signatures may be used to distinguish between species of animals (e.g., deer, horse, cattle, etc.). In some examples, the edges may include additional information such as a three-dimensional angle between the nodes, and/or a viewing angle corresponding to the edge configuration (e.g., an azimuth or elevation relative to the vehicle).

In examples, the scene depicted in the data 404 may be tiled or tessellated into smaller rectangles or squares, and a spectral response computed for each tile, to achieve a higher likelihood of detecting a match, particularly when the object of interest occupies a small portion of the overall scene. In an example graph 420 illustrated in FIG. 4, which may represent at least the portion of the scene, each node 420A, 420B, 420C is associated with a spectral response as shown. In the example graph 420, the nodes 420A, 420B, 420C are connected by edges 424 indicating an adjacency or proximity relationship between the nodes. The spectral responses associated with each node may be captured from an area within the portion of the scene. In some examples, each node 420A, 420B, 420C of the graph 420 may represent a tile in the portion of the scene.

In some examples, a candidate region, which may contain a potential object, may be identified based on one or more sensor modalities, and the graph 420 may represent the candidate region. For example, the candidate region may be based on a point cloud from LiDAR sensors, and correspond to a cluster of points located a threshold height above a driving surface which may indicate a potential object. As another example, image segmentation and classification techniques may be applied on a visible light image of the scene to identify a segment of interest, and the graph 420 may represent the segment of interest. In some examples, the spectral response associated with each node may include responses from other materials in the scene not associated with object(s) of interest, e.g., due to imperfect segmentation of the object of interest or tiles including background elements of the scene. For example, the spectral response 420A may include responses, shown by dashed lines 422 from other materials in the scene not associated with object(s) of interest.

In some examples, a library of known signatures 426 may be used to determine the match. In examples, the library 426 may include spectral signatures from materials and/or graph signatures from objects or classes of objects. For example, signatures of the library 426 may include graph signatures of objects or object classes (e.g., graph signature 426(1)) or histogram representations of intensity responses in specific spectral bands, characteristic of specific materials (e.g., spectral signature 426(N) of hemoglobin). The materials and object classes represented in the library 426 may be associated with objects of interest typically encountered in a road scene (e.g., various animals, debris of various kinds, humans as pedestrians, cyclists, skateboarders, etc.). The library 426 of known signatures may be previously generated and stored in a memory accessible to the vehicle computing system(s) 122.

In some examples, at the operation 418, determining the match may include determining matches between the spectral responses associated with the nodes 420A, 420B, 420C of the graph 420 with spectral signatures in the library 426, followed by determining whether the spatial relationship indicated by the edges 424 is satisfied by a candidate spectral signature corresponding to a known object or object class.

As a non-limiting example, histogram intersection techniques may be used to identify a presence of one or more of the spectral signatures of the library 426 in the spectral responses associated with the portion of the scene. As can be understood, multispectral data of a scene is analogous to a color representation of the scene (e.g., comprising three spectral bands-red, green, and blue-all in the visible light portion of the spectrum). Histogram intersection techniques are effective in identifying objects with characteristic color signatures (and similarly, other characteristic spectral signatures), and do not require separation of such objects from their background elements. For example, at the operation 418, histogram intersection techniques may be used to find matches between the spectral responses associated with the nodes 420A, 420B, 420C of the graph 420 and the spectral signatures and/or the spectral signatures associated with nodes of graph signatures of the library 426. For example, a histogram intersection value higher than a threshold value may indicate a match.

As another example, at the operation 418, the spectral responses corresponding to the nodes 420A, 420B, 420C of the graph 420 may be compared with the spectral signatures of the spectral signature library 426 to determine a distance or a similarity with one or more spectral signatures and/or the spectral signatures associated with nodes of graph signatures of the library 426. In some examples, the spectral signatures of the library 426 may be represented as N-dimensional points (e.g., coordinate value in a $n^{th}$ dimension corresponding to intensity value in the $n^{th}$ spectral band). In such examples, the distance between a spectral response and a spectral signature may be computed as a Euclidean distance, cosine similarity, city block distance, and the like. In examples, the process 400 may determine a match between a spectral response and a spectral signature of the library 426 if the distance between them is lower than a match threshold (or higher than a similarity threshold). In some examples, the process 400 may determine a confidence score indicative of a degree of match based on the distance (or similarity) e.g., the confidence score may be inversely related to the distance. In any examples, spectral signatures of the library 426 may be indexed for efficient matching, particularly if the library 426 is large.

Additionally, or alternatively, at the operation 418, the process 400 may determine a match between a spectral response and a spectral signature by utilizing a trained machine learned model configured to output a match with a known material when receiving, as input, a spectral response. For example, such a ML model may be trained on example spectral signatures for a wide variety of materials and object classes of interest. The ML model may further output a confidence score of the match with the spectral signature.

In some examples, where the portion of the scene is represented as a graph (e.g., the graph 420), at the operation 418, the graph 420 may be directly matched with a graph signature of the library 426 (e.g., graph signature 426(M)). For example, at the operation 418, the process 400 may determine the match using a trained graph neural network (GNN) configured to output a matching known object or object class when a graph (e.g., the graph 420) is provided as input. The GNN may also output a confidence level associated with the match. In examples, such a GNN may be trained on graph signatures for a wide variety of object classes of interest.

Additionally, in some examples, based on matching the spectral signature of hemoglobin 426(N), the process 400 may determine if a detected object is a living animal. Oxy- and deoxy-hemoglobin (which are active constituents of blood in living animals) have characteristic spectral signature 426(N) in low-wavelength infrared (LWIR) and visible bands of the spectrum. For example, at the operation 418, the spectral response 420A, which may be reweighted to emphasize the bands corresponding to the oxy- and deoxy-hemoglobin absorbance/reflectance signatures, may be compared with the signature 426(N), to determine if a match is present. In some examples, a neural network, trained to output a determination of whether an input spectral signature indicates a presence of hemoglobin, may be used to determine if the match is present. In some examples, the neural network may output a probability instead of a binary determination as output, and a threshold may be applied to the probability to determine if an object considered "alive" is represented in the input spectral signature. In some examples, detection of other materials indicative of an "alive" state may be utilized e.g., sweat, mucus, and the like. Additionally, a lack of materials such as methane, in conjunction with materials such as fur or bone, may be used as indicative of an "alive" state.

At an operation 428, the process 400 may determine presence of an object and/or its classification, based on the match(es) determined at the operation 418. As discussed, the signatures of the library 426 are each associated with a material or an object class. As an example illustrated in FIG. 4, the graph signature 426(M), which was determined to be matching the graph 420, may be associated with an object class "animal," and at least one of the spectral responses associated with the nodes of the graph 420 may correspond to a material "fur." Therefore, based on the match, at the operation 428, an output 430 corresponding to the data 404 may be determined indicating the presence of the material "fur," and a corresponding object class "animal." Further, if the characteristic spectral signature 426(N) of hemoglobin is detected at the operation 418, the output 430 may further include an indication that the animal is alive (and thus, different from detection of road-kill).

In some examples, the graph 420 may be associated with a segment or region of the data 404, and the detection and classification may be associated with the segment or region (e.g., region 432 as shown). In such examples, the process 400 may output the region 432 of the data 404 along with the output 430. Additionally, the process 400 may output a confidence score indicative of a level of certainty that the region 432 (or the data 404) represents the object and/or labels indicated in the output 430. In examples, the confidence score may be based on a degree of match (e.g., a distance, histogram intersection value, a similarity, output confidence score of a ML model indicating the match etc.) between the graph 420 and the corresponding matching spectral signature 426(M). In some examples, the confidence score may be further based on characteristics of the region or segment 432 (e.g., compactness, size, context in the environment, and the like). In some examples, the vehicle computing system(s) may determine that an object is present based on the confidence score being greater than or equal to a confidence threshold. The vehicle computing system(s) may consider a location, a size, and/or the labels indicated in the output 430 of the region 432 in controlling the vehicle e.g., to perform evasive operations to avoid impacting an object.

Alternatively, a machine-learned (ML) model (e.g., a CNN, GNN, RNN, etc.) may be trained to directly detect object(s) in the data 404, and the process 400 may utilize such a trained ML to determine a location and classification of object(s) in the data 404, along with a confidence score as output by the ML.

Figure 5:
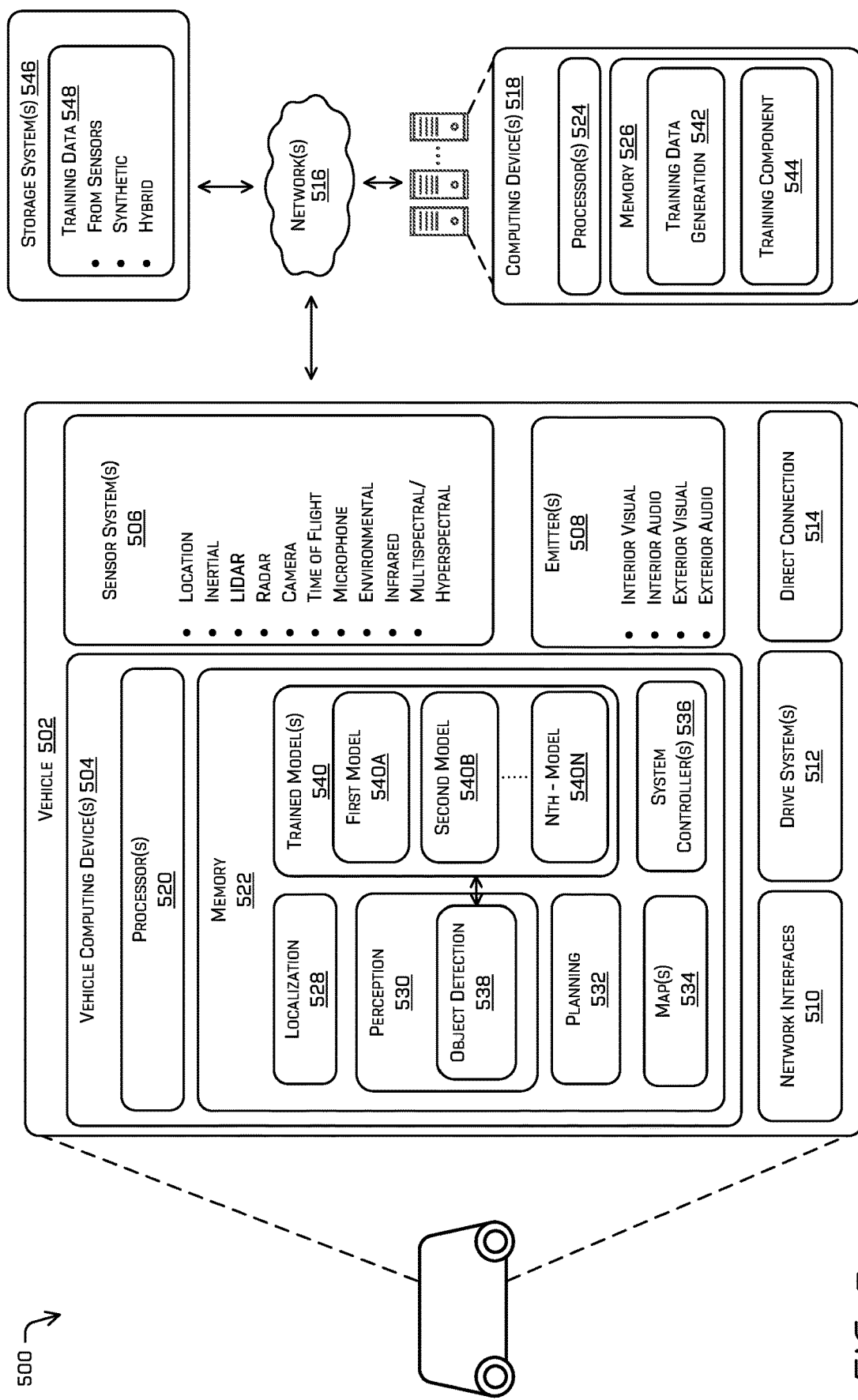
FIG. 5 is a block diagram of an example computing system for implementing the techniques described herein.

FIG. 5 illustrates a block diagram of an example system 500 that implements the techniques discussed herein. In some instances, the example system 500 may include a vehicle 502, which may represent the vehicle 102 in FIG. 1. In some instances, the vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 502 may be a fully or partially autonomous vehicle having any other level or classification. Moreover, in some instances, the techniques described herein may be usable by non-autonomous vehicles as well (e.g., vehicles with driver-assist systems).

The vehicle 502 may include a vehicle computing device(s) 504, one or more sensor system(s) 506, emitter(s) 508, network interfaces 510, drive system(s) 512, and/or at least one direct connection 514. The vehicle computing device(s) 504 may represent the vehicle computing system(s) 122 and the sensor system(s) 506 may represent the sensor system(s) 116.

In some instances, the sensor system(s) 506 may include LiDAR sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB) cameras, intensity, depth, time of flight cameras, etc.), microphones, wheel encoders, environment sensors (e.g., thermometer, hygrometer, light sensors, pressure sensors, etc.), etc. In some examples, the sensor system(s) 506 may include multispectral or hyperspectral sensors capturing data spanning a wide range of the electromagnetic spectrum (e.g., ultra-violet, visible light, visible light, infra-red). The sensor system(s) 506 may include multiple instances of each of these or other types of sensors. For instance, the cameras may include multiple cameras disposed at various locations about the exterior and/or interior of the vehicle 502. The sensor system(s) 506 may provide sensor data to the vehicle computing device(s) 504.

The vehicle 502 may also include emitter(s) 508 for emitting light and/or sound, as described above. The emitter(s) 508 in this example may include interior audio and visual emitter(s) to communicate with passengers of the vehicle 502. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 508 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 502 may also include network interfaces 510 that enable communication between the vehicle 502 and one or more other local or remote computing device(s). For instance, the network interface(s) 510 may facilitate communication with other local computing device(s) on the vehicle 502 and/or the drive component(s) 512. Also, the network interfaces 510 May additionally or alternatively allow the vehicle to communicate with other nearby computing device(s) (e.g., other nearby vehicles, traffic signals, etc.). The network interface(s) 510 may include physical and/or logical interfaces for connecting the vehicle computing device(s) 504 to another computing device or a network, such as network(s) 516. For example, the network interface(s) 510 may enable Wi-Fi-based communication such as via frequencies defined by the IEEE 600.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 504 and/or the sensor system(s) 506 may use the network interface(s) 510 to send sensor data, or other data, via the network(s) 516, to external computing device(s) 518 at a particular frequency, after a lapse of a predetermined period of time, in near real-time, etc. In some examples, the computing device(s) 518 may comprise one or more nodes of a distributed computing system (e.g., a cloud computing architecture).

In some instances, the vehicle 502 may include one or more drive system(s) 512. In some instances, the vehicle 502 may have a single drive system 512. In some instances, the drive system(s) 512 may include one or more sensors to detect conditions of the drive system(s) 512 and/or the surroundings of the vehicle 502. By way of example and not limitation, sensor(s) of the drive system(s) 512 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive system(s), cameras or other image sensors, ultrasonic sensors to acoustically detect objects in the surroundings of the drive component, lidar sensors, radar sensors, etc. Some sensors, such as the wheel encoders may be unique to the drive system(s) 512. In some cases, the sensor(s) on the drive system(s) 512 may overlap or supplement corresponding systems of the vehicle 502 (e.g., the sensor system(s) 506).

The drive system(s) 512 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 512 may include a drive system controller which may receive and preprocess data from the sensor(s) and to control operation of the various vehicle systems. In some instances, the drive system controller may include one or more processors and memory communicatively coupled with the one or more processors. The memory may store one or more components to perform various functionalities of the drive system(s) 512. Furthermore, the drive system(s) 512 may also include one or more communication connection(s) that enable communication by the respective drive system with one or more other local or remote computing device(s).

The vehicle computing device(s) 504 may include processor(s) 520 and memory 522 communicatively coupled with the processor(s) 520. The computing device(s) 518 may also include processor(s) 524, and/or memory 526. The processor(s) 520 and/or 524 may be any suitable processor capable of executing instructions to process data and perform operations as described herein. By way of example and not limitation, the processor(s) 520 and/or 524 may comprise one or more central processing units (CPUs), graphics processing units (GPUs), tensor processing units (TPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 522 and/or 526 may be examples of non-transitory computer-readable media. The memory 522 and/or 526 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 522 may store a localization component 528, perception component 530, planning component 532, map(s) 534, and/or system controller(s) 536. Further, the perception component 530 may include an object detection component 538, which may represent the object detection component 124.

In at least one example, the localization component 528 may include hardware and/or software to receive data from the sensor(s) 506 to determine a position, velocity, and/or orientation of the vehicle 502 (e.g., one or more of an x-, y-, z-position, roll, pitch, or yaw). For example, the localization component 528 may include and/or request/receive the map(s) 534 of an environment and can continuously determine a location, velocity, and/or orientation of the autonomous vehicle within the map(s) 534. In some instances, the localization component 528 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 528 may provide data to various components of the vehicle 502 to determine an initial position of an autonomous vehicle for generating a trajectory and/or for generating map data, as discussed herein.

The perception component 530 may include functionality to perform object detection, segmentation, and/or classification. In some examples, the perception component 530 may provide processed sensor data that indicates a presence of an object that is proximate to the vehicle 502 and/or a classification of the object with an object type (e.g., car, animal, pedestrian, cyclist, building, tree, road surface, curb, sidewalk, unknown, etc.) to other components e.g., the planning component 532. In additional or alternative examples, the perception component 530 can provide processed sensor data that indicates one or more characteristics associated with a detected object and/or the environment in which the object is positioned. In some examples, characteristics associated with an object can include, but are not limited to, an x-position (global position), a y-position (global position), a z-position (global position), an orientation, an object type (e.g., a classification), a velocity of the object, an extent of the object (size), etc. Characteristics associated with the environment can include, but are not limited to, a presence of another object in the environment, a state of another object in the environment, a time of day, a day of a week, a season, a weather condition, an indication of darkness/light, etc.

In some instances, perception component 530 can include the object detection component 538 to detect object(s) in in an environment surrounding the vehicle 502 (e.g., identify that an object exists), classify the object(s) (e.g., determine an object type associated with a detected object), identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. The object detection component 538 may be the object detection component 124, and may utilize trained model(s) 540, residing in the memory 522, to provide functionality described above. In examples, the trained model(s) 540 may correspond to the trained ML model(s) 126, and include models 540A, 540B, 540N trained to detect objects in various types of input data. For example, the first model 540A may be configured to receive, as input, a visible light image and an infrared image (e.g., similar to ML model 204), the second model 540B may be configured to receive, as input, multi-spectral data, a third model (not shown) may be configured to receive, as input, a visible light image and a depth image or a RGB+depth image, and the like, to output an indication of object(s) in the environment and/or class labels. As an example, the second model 540B may provide functionality of the operations 418, 428, and/or 432 of the process 400. In examples, one or more of the models 540A, . . . , 540N may be used by the object detection component 538, which may be based on availability of various types of sensor data, environment conditions, reliability of a given modality of data, and the like. For example, the object detection component 538 may use infrared images to detect pedestrians in darkness, may use LiDAR (depth) information in foggy conditions, and so on.

The planning component 532 may determine a path or trajectory for the vehicle 502 to follow to traverse through an environment. For example, the planning component 532 can determine various routes and paths and various levels of detail. In some instances, the planning component 532 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 532 can generate an instruction for guiding the autonomous vehicle along at least a portion of the route from the first location to the second location. In at least one example, the planning component 532 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

The planning component 532 may receive a location and/or orientation of the vehicle 502 from the localization component 528 and/or perception data from the perception component 530 and may determine instructions for controlling operation of the vehicle 502 based at least in part on any of this data. For example, the presence of object(s) may be used to modify a planned trajectory of the vehicle to avoid the object(s), reduce the speed of the vehicle, or bring the vehicle to a safe stop before impacting the object(s). In some examples, the controlling the vehicle may be based on characteristics of the object(s), such as an estimated size, average height, classification, whether alive, and the like. Using this data, the planning component 532 can determine a route to travel from a first location (e.g., a current location) to a second location (e.g., a target location) to avoid objects in an environment. In at least some examples, such a planning component 532 may determine there is no such collision free path and, in turn, provide a path which brings vehicle 502 to a safe stop avoiding all collisions and/or otherwise mitigating damage. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 536 and/or drive component(s) 512 may parse/cause to be carried out, second instructions for the emitter(s) 508 may be formatted according to a second format associated therewith).

The memory 522 can further include map(s) 534 that may be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the map(s) 534 can include at least one map (e.g., images and/or a mesh). In some examples, the vehicle 502 can be controlled based at least in part on the map(s) 534. That is, the map(s) 534 can be used in connection with the localization component 528, the perception component 530, and/or the planning component 532 to determine a location of the vehicle 502, identify objects in an environment, generate prediction probability(ies) associated with objects and/or the vehicle 502, and/or generate routes and/or trajectories to navigate within an environment. In some examples, the map(s) 534 may be stored on a remote computing device(s) (such as the computing device(s) 518) accessible via the network(s) 516. In some examples, multiple maps 534 can be stored based on, for example, a characteristic (e.g., type of object, time of day, day of week, season of the year, etc.). Storing multiple maps 534 can have similar memory requirements but can increase the speed at which data in a map can be accessed.

The memory 526 may additionally store a training data generation component 542, and/or a training component 544 to implement functionality of the processes 200, 300, 302, and/or 304. In some examples, the training data generation component 542 may provide functionality for annotating data by implementing the annotator component 216 and the annotation transfer component 218. The training data generation component 542 may receive data (e.g., first data 212, second data 214) captured by the sensor system(s) 506 of the vehicle 502. For example, the data may be downloaded from the vehicle 502 using the direct connection 514, or may be transmitted to the remote computing device(s) 518 via the network(s) 516. Additionally, or alternatively, the data may be stored on storage system(s) 546 accessible to the computing device(s) 518. For example, the storage system(s) 546 may be remote and accessible via the network(s) 516, or the storage system(s) 546 may be operably connected to the computing device(s) 518 through local connections. Annotated output of the training data generation component 542 may also be stored as training data 548 on the storage system(s) 546. In some examples, the training data generation component 542 may also implement processes 300, 302, and/or 304 to generate training data (e.g., synthetic data or hybrid data), which may be stored in the memory 526 or on the storage system(s) 546 as the training data 548.

The training component 544 may use the training data 548 to train ML models (e.g., similar to training component 202), which may be provided to the vehicle computing device(s) 504 as the trained model(s) 540. The ML models may be trained to output global probabilities of occurrence for a set of object classes in input data, and/or an output image indicating pixel-level probabilities of occurrence of object(s). The training component 544 may use learning techniques such as backpropagation to iteratively adjust a set of parameters of the ML models, based on inputs and corresponding expected outputs provided in the training data 548. In some instances, the training component 544 may be executed by the processor(s) 524 to train a machine learning model based on training data 550. In examples, the training component 544 may re-train the model(s) 540 periodically and/or when the training data 548 is updated.

Although the localization component 528, the perception component 530, the planning component 532, the map(s) 534, and/or the system controller(s) 536 are illustrated as being stored in memory 522, any of these components may include processor-executable instructions, machine-learned model(s) (e.g., a neural network), and/or hardware and all or part of any of these components may be stored on the memory 526 or configured as part of the computing device(s) 518.

As described herein, the localization component 528, the perception component 530, the planning component 532, and/or other components of the system 500 may comprise one or more ML models. For example, the localization component 528, the perception component 530, and/or the planning component 532 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 6 (ID6), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, Hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, EfficientNet, PointNet, Xception, and the like or visual transformers (ViTs), such as ConvNext.

Memory 522 may additionally or alternatively store one or more system controller(s) 536, which may be configured to control steering, propulsion, braking, safety, emitters, communication, and other systems of the vehicle 502. These system controller(s) 536 may communicate with and/or control corresponding drive system(s) 512 and/or other components of the vehicle 502. For example, the planning component 532 may generate instructions based at least in part on perception data generated by the perception component 530, and/or transmit instructions to the system controller(s) 536. The system controller(s) 536 may control operation of the vehicle 502 based at least in part on the instructions received from the planning component 532. In some examples, the vehicle computing device(s) 504 may implement an architecture including a primary system to control the vehicle 502 and a secondary safety system that operates on the vehicle 502 to validate operation of the primary system and to control the vehicle 502 to avoid collisions. In examples, if the secondary safety system detects a likely collision of the vehicle with an object, the secondary system may generate commands that cause the vehicle to perform a maneuver, such as decelerating, changing lanes, swerving, etc. In such examples, the system controller(s) 536 may receive instructions (e.g., a contingent trajectory that may specify an alternate maneuver) from the secondary safety system, and operate the vehicle 502 based on those instructions.

It should be noted that while FIG. 5 is illustrated as a distributed system, in alternative examples, components of the vehicle 502 may be associated with the computing device(s) 518 and/or components of the computing device(s) 518 may be associated with the vehicle 502. That is, the vehicle 502 may perform one or more of the functions associated with the computing device(s) 518, and vice versa.

Figure 6:
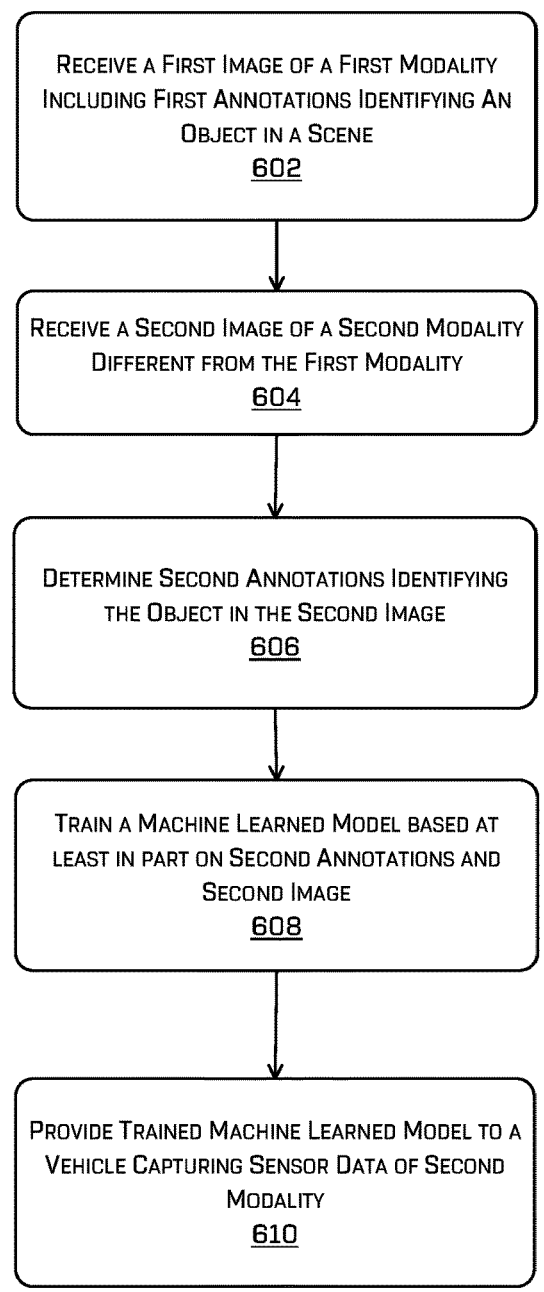
FIG. 6 illustrates an example process for generating training data for training a machine learned model for detecting objects, as described herein.
Figure 7:
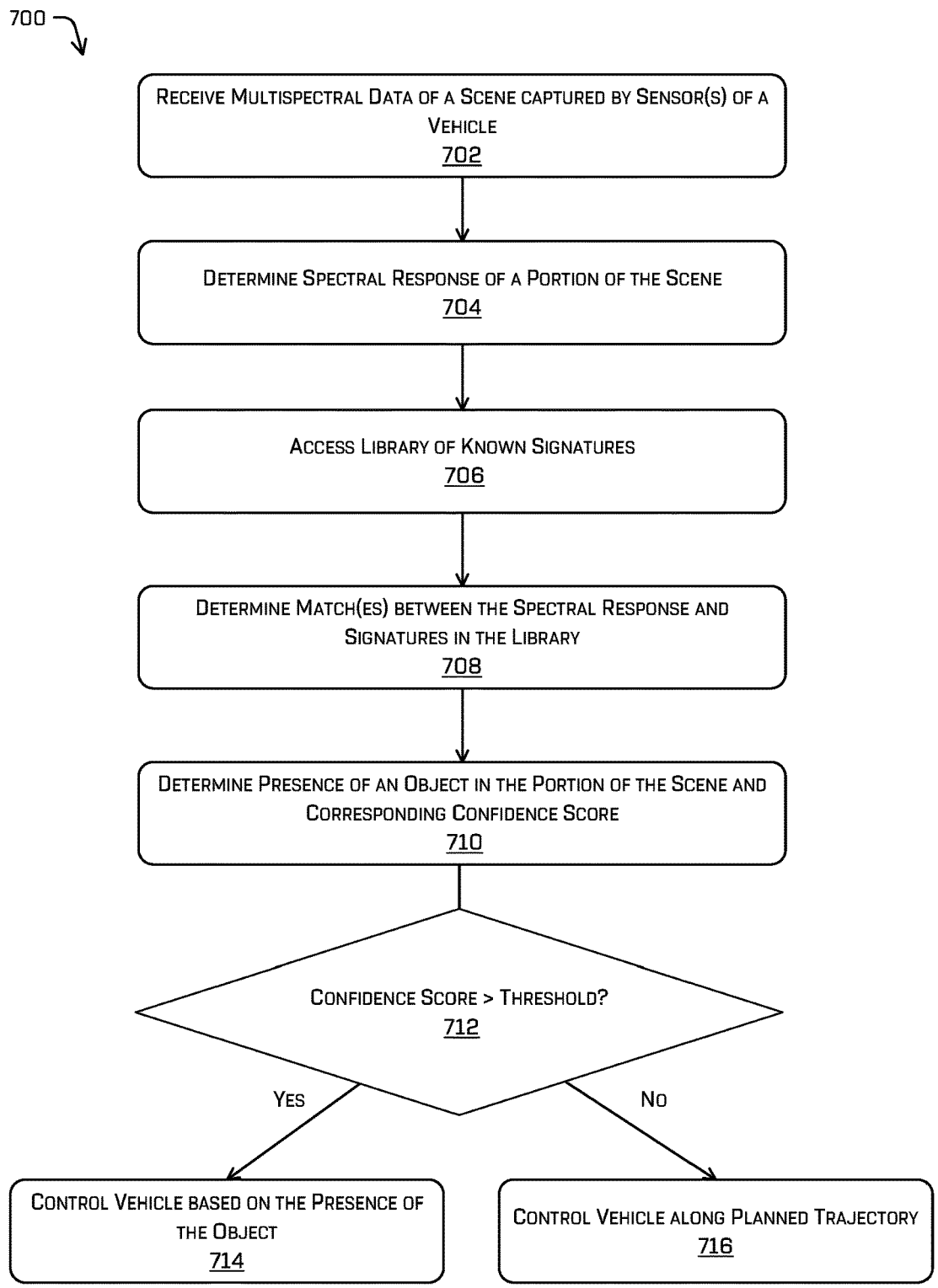
FIG. 7 illustrates an example process for detecting objects using multispectral data for use in controlling a vehicle, as described herein.

FIGS. 6 and 7 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 6 is an example process 600 for generating training data for training a machine learned model for detecting objects in image data of a modality where annotations are not available. In examples, some or all of the process 600 may be performed by one or more components in FIGS. 5, as described herein. For example, some or all of the process 600 may be performed by the training data generation component 542.

At an operation 602, the process 600 may include receiving a first image of a first modality including first annotations identifying an object in a scene (e.g., a scene in an environment being traversed by a vehicle (e.g., the autonomous vehicle 102, 502). In some examples, the first modality may be a visible light image, and the first annotations may be auto-generated by a machine learned model trained to detect and classify objects in a visible light image. In examples, the first annotations may include a bounding box, contour, or segment corresponding to the object, identification of pixels associated with the object, and/or a class label identifying a type of the object (e.g., animal, car, pedestrian, cyclist, tree, unknown, etc.).

At an operation 604, the process 600 may include receiving a second image of a second modality, different from the first modality. For example, if the first modality is a visible light image, the second modality may be in spectral band(s) at least partially outside the visible light band (e.g., infrared, ultraviolet, multispectral, etc.). In some examples, the second image may be a paired or companion image of the first image (e.g., corresponding to a same scene and captured at a same time or a time close to each other), captured by sensor(s) of the first modality and the second modality, mounted on a vehicle traversing the scene. In other examples, the second image may depict the same scene but at a different time.

At an operation 606, the process 600 may include determining second annotations identifying the object in the second image. As described with reference to FIG. 2, the second image may be aligned with the first image using geometric relationships or sensor parameters associated with sensors capturing the first image and the second image, when available (e.g., in paired images). Alternatively, or in addition, the first image and the second image may be aligned using keypoint matches, determining a homography transformation, and/or matching segments corresponding to permanent structures in the scene. After alignment, the first annotations may be transferred to corresponding location(s) in the second image as second annotations. As an example, if a top-left corner of a bounding box of width, w, and height, h, is located at coordinates (x, y) of the first image, the second annotation comprises of a bounding box of width, w, and height, h, with a top-left corner located at coordinates (x, y) of the second image. In another example, if the first annotation indicates an object class "cat," the second annotation also comprises the object class "cat."

At an operation 608, the process 600 may include training a machine learned (ML) model based at least in part on the second annotations and the second image. For example, the ML model (e.g., CNN, RNN, GNN, FCN, etc.) may be trained using techniques such as backpropagation during which a set of parameters (or weights) of the ML model may be adjusted to reduce an error between an output of the ML model and an expected output (as indicated by the first and/or second annotations). In some examples, the ML model may be trained with both inputs of the first modality and the second modality. In other examples, the ML model may be trained with inputs of the second modality (e.g., the second image) to detect objects in images of the second modality.

At an operation 610, the process 600 may include providing the trained ML model (which may be the trained ML model 126) to a vehicle (e.g., the vehicle 102) that includes sensors for capturing sensor data of the second modality. As described with reference to FIG. 1, the vehicle may utilize the trained ML model to detect object(s) impacting a planned trajectory of the vehicle, based on data of the first modality and/or the second modality as captured by sensors mounted on the vehicle. The output of the trained ML model may be used to control the vehicle to avoid collision with the detected object(s) or continue along the planned trajectory, based on location(s) and class label(s) associated with the detected object(s).

FIG. 7 is an example process 700 for determining presence of an object depicted in a scene captured by a sensor of a vehicle, and controlling the vehicle based on the presence of the object. For example, some or all of the process 700 may be performed by one or more components shown in FIG. 1 or 5, as described herein. For example, some or all of the process 700 may be performed by the object detection component 124, or the object detection component 538. In some examples, the process 700 can represent a process for determining presence of an object similar to the operations performed by process 400 of FIG. 4.

At an operation 702, the process 700 may include receiving multispectral data captured by sensor(s) of a vehicle while the vehicle is traversing a scene. As discussed, multispectral data may comprise data spanning several discrete spectral bands (e.g., ultra-violet to visible light, visible light to infra-red), and/or hyperspectral sensor(s) which may capture nearly continuous wavelength bands. In some examples, other modalities of data may also be received at the operation 702 in addition to the multispectral data (e.g., depth data).

At an operation 704, the process 700 may include determining a spectral response corresponding to a portion of the scene. In examples, the portion may correspond to a segment of interest determined in the data, and/or one or more tiles of the data that has been tessellated into tiles. In some examples, the spectral response may be represented as a histogram of intensity values in selected bands, of the portion of the scene. In other examples, the spectral response may be represented as a graph, with each node representing a spectral response from an area of the portion of the scene, and edges of the graph representing an adjacency or proximity relationship between the corresponding areas. The selected bands may be determined based on dimensionality reduction techniques applied to the multispectral data and/or based on knowledge of responses of commonly encountered materials in the various spectral bands. In some examples, the spectral response may correspond to average intensity values corresponding to the portion of the scene, in the selected spectral bands. In some examples, the multispectral data, in its entirety, may be used to determine the spectral response.

At an operation 706, the process 700 may include accessing a library of known signatures. The library may include spectral signatures corresponding to commonly encountered materials, particularly in context of a vehicle driving in an environment. Materials (both man-made and natural) have unique spectral signatures, e.g., a specific material may exhibit high (or low) intensity responses in specific spectral bands. In some examples, the spectral signatures may be stored as histograms, with each bin corresponding to a spectral band. In other examples, the spectral signatures may be stored as continuous intensity plots over a range of wavelengths or N-dimensional points (where N is a number of spectral bands). In some examples, the library may store graph signatures corresponding to classes of objects, indicating spectral signatures and their spatial relationships.

At an operation 708, the process 700 may include determining match(es) between the spectral response of the portion of the scene generated at the operation 704, and one or more spectral signatures or graph signature in the library. For instance, at the operation 708, a distance between the spectral signature generated at the operation 704 and each of the spectral signatures in the spectral signature library may be determined. Without limitation, the distance can be a histogram intersection value, a Euclidean distance, cosine similarity, and the like. At the operation 708, the process 700 may determine a matching spectral signature, based on the distance being less than a threshold. In some examples, at the operation 708, the process 700 may determine matches between a graph representation of the portion of the scene and a graph signature in the library by utilizing a trained graph neural network (GNN). In some examples, at the operation 708, a confidence score indicative of a degree of match may be determined based on the distance.

At an operation 710, the process 700 may include determining presence of an object in the portion of the scene and a corresponding confidence score. As discussed with reference to FIG. 4, the spectral signatures of the library are each associated with a material and/or class of object. The presence of an object may be determined based on the one or more matches generated at the operation 710 e.g., the material and/or object class associated with the match(es) may be indicative of the presence of an object. The confidence score of the match(es) may indicate the confidence score of the presence of the object. As an example, a match with spectral signatures of the library that are associated with labels of "fur" and "hemoglobin," may have a high confidence of the presence of an object of the class "animal."

At an operation 712, the process 700 may determine if the confidence score is greater than a threshold. If it is determined that the confidence score is greater than the threshold, (at 712—Yes), the process 700 may control the vehicle based on the presence of the object at an operation 714. For example, the presence of the object may be used to determine a new trajectory of the vehicle that avoids the object, slows down the speed of the vehicle, or brings the vehicle to a safe stop before impacting the object. In some examples, the new trajectory may be a safe stop trajectory (e.g., a trajectory to stop the vehicle with a "comfortable" deceleration (e.g., less than maximum deceleration) or an emergency stop trajectory (e.g., maximum deceleration with or without steering inputs). In some examples, the controlling the vehicle may be based on the class label(s) associated with the object, where objects with certain labels may be ignored. For example, an object associated with a material label "cardboard" or a small animal classified as "not alive" may be ignored.

Alternatively, if it is determined that the confidence score is less than the threshold (at 712—No), the process 700 may control the vehicle along the planned trajectory at the operation 716. In some examples, the process 700 may deploy further verification steps such as using data from sensors of additional modalities (e.g., depth sensors), alerting a human operator in the vehicle, or using other data from remote computing system(s) communicating with the vehicle.

Example Clauses

A: An example system comprising: one or more processors; and one or more non-transitory computer-readable media storing instructions executable by one or more processors, wherein the instructions, when executed, cause the system to perform operations comprising: receiving a first image in a first wavelength band, the first image including a first annotation indicative of an object; inputting the first image to a first machine-learned (ML) model trained to receive an input image in the first wavelength band, and generate an output image in a second wavelength band different from the first wavelength band; receiving, as output from the first ML model and based at least in part on the first image, a second image in the second wavelength band, wherein the second image includes a representation of the object in the second wavelength band; determining, based on the first image and the first annotation, a second annotation indicative of the object in the second image; and training, based at least in part on the second annotation and the second image, a second ML model configured to receive, from sensors associated with an autonomous vehicle, a first input image of the first wavelength band and a second input image of the second wavelength band, and output an indication of the object to a component of the autonomous vehicle.

B: The system of example A, wherein the first image is an output of a generative ML model configured to output an image in the first wavelength band in response to prompts indicative of the object and an environment that the object is disposed in.

C: The system of example A or example B, wherein the first image comprises: a background scene outputted by a generative ML model, and a representation of the object in the first wavelength band incorporated into the background scene.

D: The system of any one of example A through example C, wherein the first ML model implements a neural style transfer algorithm trained on images in the first wavelength band and images in the second wavelength band.

E: The system of any one of example A through example D, wherein the first annotation comprises a first bounding box representative of a location of the object in the first image and the second annotation comprises a second bounding box representative of a location of the object in the second image.

F: An example method comprising: receiving a first image of a first modality, the first image including an annotation indicative of an object; generating, based on the first image, a second image including a representation of the object of a second modality different from the first modality; based on the first image and the annotation, associating the object in the second image with the annotation; and training, based at least in part on the second image and the annotation, a machine-learned (ML) model configured to receive, from sensors associated with an autonomous vehicle, a first input image of the first modality and a second input image of the second modality and output an indication of the object.

G: The method of example F, wherein the ML model is a first ML model, and generating the second image comprises: inputting, to a second ML model trained to receive an input image of the first modality, and generate an output image of the second modality, the first image; and receiving, as output from the second ML model, the second image.

H: The method of example For example G, wherein the second ML model implements a neural style transfer algorithm trained on images of the first modality and images of the second modality.

I: The method of any one of example F through example H, wherein the annotation comprises an indication of a first location of the object in the first image or an object label indicative of an object type.

J: The method of any one of example F through example I, wherein the first modality corresponds to visible light, and the second modality corresponds to one of: infrared, depth, ultraviolet, or multispectral.

K: The method of any one of example F through example J, further comprising: inputting, to the ML model, a third image of the first modality captured by a first sensor of the autonomous vehicle and a fourth image of the second modality captured by a second sensor of the autonomous vehicle; and receiving, as output from the ML model, an object class corresponding to the object and a confidence score.

L: The method of any one of example F through example K, further comprising: determining that the confidence score exceeds a confidence threshold; and based on determining that the confidence score exceeds the confidence threshold, controlling the autonomous vehicle based at least in part on the object class.

M: The method of any one of example F through example L, wherein controlling the autonomous vehicle comprises one or more of: modifying a trajectory of the autonomous vehicle to avoid the object, reducing a speed of the autonomous vehicle, or bringing the autonomous vehicle to a safe stop.

N: The method of any one of example F through example M, wherein training the ML model further comprises pre-training using self-supervised learning.

O: The method of any one of example F through example N, wherein the second modality corresponds to multispectral data comprising multiple spectral bands, the method further comprising: determining, based on data in one or more spectral bands of the multiple spectral bands, that the object is alive.

P: The method of any one of example F through example O, wherein the ML model is trained based on data in a subset of the multiple spectral bands of the second image.

Q: An example A non-transitory computer-readable medium storing instructions executable by a processor, wherein the instructions, when executed, cause the processor to perform operations comprising: receiving first data including a first annotation indicative of an object, captured by a first sensor in a first wavelength band; generating second data in a second wavelength band, different from the first wavelength band, the second data including a representation of the object in the second wavelength band; determining, based on the first data and the first annotation, a second annotation indicative of the object in the second data; and training, based at least in part on the second annotation and the second data, a machine-learned (ML) model configured to receive, from a sensor associated with an autonomous vehicle, input data in the second wavelength band, and output an indication of the object in the second data.

R: The non-transitory computer-readable medium of example Q, wherein training the ML model is further based on input data in the second wavelength band generated by a second ML model configured to generate an output in the second wavelength band in response to an input in the first wavelength band and one or more tokens representing the object.

S: The non-transitory computer-readable medium of example Q or example R, wherein the ML model is a first ML model, and generating the second data comprises: inputting, to a second ML model trained to receive input data in the first wavelength band, and generate output data in the second wavelength band, the first data; and receiving, as output from the second ML model, the second data.

T: The non-transitory computer-readable medium of example Q through example S, wherein the indication of the object comprises at least one of: a confidence score associated with a presence of the object, a region of the second data corresponding to the object, or an object class.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by one or more processors, wherein the instructions, when executed, cause the system to perform operations comprising:
  receiving a first image in a first wavelength band, the first image including a first annotation indicative of an object, wherein the first image is generated by:
    receiving, as an output of a generative machine-learned (ML) model, a background image not including the object, and
    rendering a representation of the object into the background image;
  inputting the first image to a first ML model trained to receive an input image in the first wavelength band, and generate an output image in a second wavelength band different from the first wavelength band;
  receiving, as output from the first ML model and based at least in part on the first image, a second image in the second wavelength band, wherein the second image includes a representation of the object in the second wavelength band;
  determining, based on the first image and the first annotation, a second annotation indicative of the object in the second image; and
  training, based at least in part on the second annotation and the second image, a second ML model configured to receive, from sensors associated with an autonomous vehicle, a first input image of the first wavelength band and a second input image of the second wavelength band, and output an indication of the object to a component of the autonomous vehicle.

2. The system of claim 1, wherein the background image is outputted by the generative ML model in response to prompts indicative of an environment that the object is disposed in.

3. The system of claim 1, wherein the first ML model implements a neural style transfer algorithm trained on images in the first wavelength band and images in the second wavelength band.

4. The system of claim 1, wherein the first annotation comprises a first bounding box representative of a location of the object in the first image and the second annotation comprises a second bounding box representative of a location of the object in the second image.

5. A method comprising:
receiving a first image of a first modality, the first image including an annotation indicative of an object;
generating, based on the first image, a second image including a representation of the object of a second modality different from the first modality;
based on the first image and the annotation, associating the object in the second image with the annotation;
receiving a third image of the second modality, wherein the third image is generated by a first machine-learned (ML) model configured to generate an output image of the second modality in response to an input image of the first modality and one or more tokens representing the object; and
training, based at least in part on the third image, second image and the annotation, a second ML model configured to receive, from sensors associated with an autonomous vehicle, a first input image of the first modality and a second input image of the second modality and output an indication of the object.

6. The method of claim 5, wherein generating the second image comprises:

inputting the first image to a third ML model trained to receive an input image of the first modality and generate an output image of the second modality; and receiving, as output from the third ML model, the second image.

7. The method of claim 6, wherein the third ML model implements a neural style transfer algorithm trained on images of the first modality and images of the second modality.

8. The method of claim 5, wherein the annotation comprises an indication of a first location of the object in the first image or an object label indicative of an object type.

9. The method of claim 5, wherein the first modality corresponds to visible light, and the second modality corresponds to one of: infrared, depth, ultraviolet, or multispectral.

10. The method of claim 5, further comprising:
inputting, to the second ML model, a fourth image of the first modality captured by a first sensor of the autonomous vehicle and a fifth image of the second modality captured by a second sensor of the autonomous vehicle; and receiving, as output from the second ML model, an object class corresponding to the object and a confidence score.

11. The method of claim 10, further comprising:
determining that the confidence score exceeds a confidence threshold; and based on determining that the confidence score exceeds the confidence threshold, controlling the autonomous vehicle based at least in part on the object class.

12. The method of claim 11, wherein controlling the autonomous vehicle comprises one or more of: modifying a trajectory of the autonomous vehicle to avoid the object, reducing a speed of the autonomous vehicle, or bringing the autonomous vehicle to a safe stop.

13. The method of claim 5, wherein training the second ML model further comprises pre-training using self-supervised learning.

14. The method of claim 5, wherein the second modality corresponds to multispectral data comprising multiple spectral bands, the method further comprising:
determining, based on data in one or more spectral bands of the multiple spectral bands, that the object is alive.

15. The method of claim 14, wherein the second ML model is trained based on data in a subset of the multiple spectral bands of the second image.

16. A non-transitory computer-readable medium storing instructions executable by a processor, wherein the instructions, when executed, cause the processor to perform operations comprising:
receiving first data including a first annotation indicative of an object, captured by a first sensor in a first wavelength band;

generating second data in a second wavelength band, different from the first wavelength band, the second data including a representation of the object in the second wavelength band;

determining, based on the first data and the first annotation, a second annotation indicative of the object in the second data;

receiving third data in the second wavelength band, wherein the third data is generated by a first machine-learned (ML) model configured to generate an output in the second wavelength band in response to an input in the first wavelength band and one or more tokens representing the object; and training, based at least in part on the second annotation, the second data, and the third data, a second ML model configured to receive, from a sensor associated with an autonomous vehicle, input data in the second wavelength band, and output an indication of the object in the second data.

17. The non-transitory computer-readable medium of claim 16, and generating the second data comprises:
inputting the first data to a third ML model trained to receive input data in the first wavelength band and generate output data in the second wavelength band; and receiving, as output from the third ML model, the second data.

18. The non-transitory computer-readable medium of claim 16, wherein the indication of the object comprises at least one of: a confidence score associated with a presence of the object, a region of the second data corresponding to the object, or an object class.

19. The system of claim 1, wherein determining the second annotation comprises:
aligning the second image with the first image to obtain an aligned second image; and determining, based on a first location of the object indicated in the first annotation, a second location of the object in the aligned second image, wherein the second annotation indicates the second location.

20. The system of claim 1, the operations further comprising:
inputting, to the second ML model, a third image in the first wavelength band captured by a first sensor of the autonomous vehicle and a fourth image of the second wavelength band captured by a second sensor of the autonomous vehicle;

receiving, as output from the second ML model, an object class corresponding to the object and a confidence score;

determining that the confidence score exceeds a confidence threshold; and based on determining that the confidence score exceeds the confidence threshold, controlling the autonomous vehicle based at least in part on the object class.

* * * * *